United States Patent [19]
Davis et al.

[11] Patent Number: 5,918,229
[45] Date of Patent: Jun. 29, 1999

[54] STRUCTURED DATA STORAGE USING GLOBALLY ADDRESSABLE MEMORY

[75] Inventors: Scott H. Davis, Groton, Mass.; John B. Carter, Salt Lake City, Utah; Steven J. Frank, Hopkinton, Mass.; Hsin H. Lee; Daniel J. Dietterich, both of Acton, Mass.

[73] Assignee: Mangosoft Corporation, Westborough, Mass.

[21] Appl. No.: 08/827,534

[22] Filed: Mar. 28, 1997

Related U.S. Application Data

[63] Continuation-in-part of application No. 08/754,481, Nov. 22, 1996.

[51] Int. Cl.$^6$ ................................................. G06F 17/30
[52] U.S. Cl. ......................... 707/10; 707/200; 707/205; 395/200.48; 705/26; 711/147
[58] Field of Search .................. 707/10, 201, 202, 707/203, 204, 205, 206; 711/203, 147, 148; 395/200.48; 705/26

[56] References Cited

U.S. PATENT DOCUMENTS

| | | | |
|---|---|---|---|
| 4,096,567 | 6/1978 | Millard et al. | 364/200 |
| 4,426,688 | 1/1984 | Moxley | 365/200 |
| 4,710,926 | 12/1987 | Brown et al. | 371/9 |
| 4,868,738 | 9/1989 | Kish et al. | 364/200 |
| 4,934,764 | 6/1990 | Leitermann et al. | 312/111 |
| 5,055,999 | 10/1991 | Frank et al. | 711/163 |
| 5,077,736 | 12/1991 | Dunphy, Jr. et al. | 371/10.1 |
| 5,117,350 | 5/1992 | Parrish et al. | 395/425 |
| 5,119,481 | 6/1992 | Frank et al. | 395/280 |
| 5,226,039 | 7/1993 | Frank et al. | 370/405 |

(List continued on next page.)

FOREIGN PATENT DOCUMENTS

| | | |
|---|---|---|
| 0 288 636 A2 | 11/1988 | European Pat. Off. . |
| 0 661 651 A1 | 7/1995 | European Pat. Off. . |
| 2 257 273 | 1/1993 | United Kingdom . |
| WO 95/02307 | 1/1995 | WIPO . |
| WO 95/14279 | 5/1995 | WIPO . |
| WO 95/22111 | 8/1995 | WIPO . |
| WO 95/25306 | 9/1995 | WIPO . |
| WO 96/23268 | 8/1996 | WIPO . |
| WO 96/30847 | 10/1996 | WIPO . |

OTHER PUBLICATIONS

"Coarse and Fine Grain Objects in a Distributed Persistent Store,", Henskens et al., Object Orientation in Operating Systems, May 1993, IEEE, pp. 116–123.

"A Model for Persistent Shared Memory Addressing in Distributed Systems,", Amaral et al., Object Orientation in Operating Systems, Sep. 1992, IEEE, pp. 2–11.

(List continued on next page.)

*Primary Examiner*—Paul R. Lintz
*Assistant Examiner*—Hosain T. Alam
*Attorney, Agent, or Firm*—Testa, Hurwitz & Thibeault, LLP

[57] ABSTRACT

In a network of computer nodes, a structured storage system interfaces to a globally addressable memory system that provides persistent storage of data. The globally addressable memory system may be a distributed shared memory (DSM) system. A control program resident on each network node can direct the memory system to map file and directory data into the shared memory space. The memory system can include functionality to share data, coherently replicate data, and create log-based transaction data to allow for recovery. In one embodiment, the memory system provides memory device services to the data control program. These services can include read, write, allocate, flush, or any other similar or additional service suitable for providing low level control of a memory storage device. The data control program employs these memory system services to allocate and access portions of the shared memory space for creating and manipulating a structured store of data such as a file system, a database system, or a Web page system for storing, retrieving, and delivering objects such as files, database records or information, and Web pages.

37 Claims, 11 Drawing Sheets

U.S. PATENT DOCUMENTS

| | | | |
|---|---|---|---|
| 5,245,563 | 9/1993 | Hauck, Jr. | 364/748.05 |
| 5,247,673 | 9/1993 | Costa et al. | 395/650 |
| 5,251,308 | 10/1993 | Frank et al. | 711/163 |
| 5,274,789 | 12/1993 | Costa et al. | 711/206 |
| 5,282,201 | 1/1994 | Frank et al. | 370/403 |
| 5,297,265 | 3/1994 | Frank et al. | 711/202 |
| 5,313,647 | 5/1994 | Kaufman et al. | 395/672 |
| 5,335,325 | 8/1994 | Frank et al. | 711/163 |
| 5,341,483 | 8/1994 | Frank et al. | 711/206 |
| 5,390,316 | 2/1995 | Cramer et al. | 395/425 |
| 5,390,326 | 2/1995 | Shah | 395/575 |
| 5,394,555 | 2/1995 | Hunter et al. | 711/148 |
| 5,408,649 | 4/1995 | Beshears et al. | 395/575 |
| 5,423,037 | 6/1995 | Hvasshovd | 395/600 |
| 5,452,447 | 9/1995 | Nelson et al. | 707/205 |
| 5,490,272 | 2/1996 | Mathis et al. | 395/650 |
| 5,493,728 | 2/1996 | Solton et al. | 711/113 |
| 5,513,314 | 4/1996 | Kandasamy et al. | 395/182.04 |
| 5,519,855 | 5/1996 | Neeman et al. | 395/600 |
| 5,522,045 | 5/1996 | Sandberg | 395/200 |
| 5,551,035 | 8/1996 | Arnold et al. | 395/650 |
| 5,560,027 | 9/1996 | Watson et al. | 395/800 |
| 5,560,029 | 9/1996 | Papadopoulos | 395/800 |
| 5,588,147 | 12/1996 | Neeman et al. | 395/601 |
| 5,592,625 | 1/1997 | Sandberg | 395/200 |
| 5,613,079 | 3/1997 | Debique et al. | 395/468 |
| 5,617,537 | 4/1997 | Yamada et al. | 395/200 |
| 5,649,194 | 7/1997 | Miller et al. | 707/200 |
| 5,675,787 | 10/1997 | Miller et al. | 707/104 |
| 5,687,308 | 11/1997 | Jardine et al. | 395/182.02 |
| 5,689,700 | 11/1997 | Miller et al. | 707/10 |
| 5,701,462 | 12/1997 | Whitney et al. | 395/610 |
| 5,727,150 | 3/1998 | Laudon et al. | 395/200 |
| 5,768,510 | 6/1998 | Gish | 395/200.33 |
| 5,781,537 | 7/1998 | Ramaswami et al. | 370/254 |
| 5,805,785 | 9/1998 | Dias et al. | 395/182.02 |
| 5,805,786 | 9/1998 | Badovinatz et al. | 395/182.02 |
| 5,812,533 | 9/1998 | Cox et al. | 370/259 |
| 5,812,751 | 9/1998 | Ekrot et al. | 395/182.02 |

OTHER PUBLICATIONS

"Towards a Resilient Shared Memory Concept for Distributed Persistent Object Systems,", Irlenbusch et al, Proceedings of teh 28th Annual Hawaii Intl. Conference on System Sciences, Jan. 1995, pp. 675–684, IEEE.

"COOL: System Support for Distributed Programming," Lea te al., Communications of teh ACM, vol. 36, No. 9, pp. 37–46, Sep. 1993.

"Support for Collaborative Design: Agents and Emergence, Edmonds et al.," Communications of the ACM, vol. 37, No. 7, pp. 41–47, Jul. 1994.

"Software Agents," Genesereth et al., Communications of the ACM, vol. 37, No. 7, pp. 48–53, Jul. 1994.

European Patent Office, European Search Report, Application No. EP 97 30 9471, mailed on Apr. 23, 1998, 3 pages.

Patent Cooperation Treaty, International Search Report, International Application No. PCT/US 97/21457, mailed on Apr. 23, 1998, 4 pages.

Patent Cooperation Treaty, International Search Report, International Application No. PCT/US 97/21458, mailed on Apr. 23, 1998, 3 pages.

Patent Cooperation Treaty, International Search Report, International Application No. PCT/US 97/21459, mailed on Apr. 23, 1998, 4 pages.

Patent Cooperation Treaty, International Search Report, International Application No. PCT/US 97/21460, mailed on Apr. 23, 1998, 5 pages.

Patent Cooperation Treaty, International Search Report, International Application No. PCT/US 97/21466, mailed on Apr. 23, 1998, 3 pages.

Patent Cooperation Treaty, International Search Report, International Application No. PCT/US 97/21733, mailed on Apr. 23, 1998, 3 pages.

Patent Cooperation Treaty, International Search Report, International Application No. PCT/US 97/21734, mailed on Apr. 23, 1998, 4 pages.

Anderson, T., et al. "Serverless Network File Systems," *Operating Systems Review (SIGOPS)*, vol. 29, No. 5, Dec. 1, 1995, pp. 109–126.

Carter, J., et al. "Network Multicomputing Using Recoverable Distributed Shared Memory," Proceedings of the Spring Computer Society International Conference (COMPCON), San Francisco, Feb. 22–26, 1993, pp. 519–527.

Huber, J., et al. "PPFS: A High Performance Portable Parallel File System," Proceedings of the International Conference on Supercomputing, Barcelona, Jul. 3–7, 1995, pp. 385–394.

"Java Dynamic Class Loader," *IBM Technical Disclosure Bulletin*, vol. 39, No. 11, Nov. 1996, pp. 107–108.

Lee, E., et al. "Petal: Distributed Virtual Disks," 7th International Conference on Architectural Support for Programming Languages and Operation Systems, Cambridge, MA, Oct. 1–5, 1996, pp. 84–92.

Neal, D. "The Harvest Object Cache in New Zealand," *Computer Networks and ISDN Systems*, vol. 11, No. 28, May 1996, pp. 1415–1430.

Raghavan, G. "A Domain Model of WWW Browsers," Proceedings of Southeastcon, Bringing Together Education, Science and Technology, Tampa, Apr. 11–14, 1996, pp. 436–439.

Ng, T. "The Design and Implementation of a Reliable Distributed Operating System—ROSE," Proceedings of the Symposium on Reliable Distributed Systems, Huntsville, Oct. 9–11, 1990, pp. 2–11.

Yeung, D., et al. "MGS" A Multigrain Shared Memory System, *Computer Architecture News*, vol. 24, No. 2, May 1, 1996, pp. 44–55.

Anderson et al. "Scheduler Activations: Effective Kernel Support for the User–Level Management of Parallelism," *Operating Systems Review (SIGOPS)*, vol. 25, No. 1, Jan. 1, 1991, pp. 95–109.

Barton–Davis et al. "Adding Scheduler Activations to Mach 3.0," Proceedings of the USENIX Mach III Symposium, Santa FE, NM, USA, Apr. 19–21, 1993, pp. 119–136.

Koppe C. "Sleeping Threads: A Kernel Mechanism for Support of Efficient User Level Threads," Proceedings of Seventh IASTED–ISMM International Conference on Parallel and Distributed Computing and Systems, Washington, DC, USA, Oct. 19–21, 1995, pp. 11–15.

Dryden, P. "Users throwing cache at networks delays" *Computerworld*, Oct. 7, 1996, http://ww.computerworld.com/search/AT–html/9610/961007SL41cacheb.html, originally printed on May 22, 1997, reprinted on Nov. 18, 1998.

Enterprise Networking Web Page, http://www.lancache.com/enad1.html, printed on May 20, 1997.

Measurement Techniques Inc. Web Page, http://www.lancache.com/pr1_4.html, printed on May 20, 1997.

Measurement Techniques Inc. Web Page, http://www.lancache.com/slc.html, printed on May 20, 1997.

Network Appliance, Inc. Web Page, http://www.netapp.com/news/level3b/news_rel_970421.html, printed on May 22, 1997.

Network Appliance, Inc. Web Page, http://www.netapp.com/products/level3/netcache/datasheet.html, printed on May 22, 1997.

Network Appliance, Inc. Web Page, http://www.netapp.com/products/level 3/webfiler.html, printed on May 22, 1997.

Peak Technologies, Inc. Web Page, http://www.peak-media.com/PeakJet/quick.html, printed on May 20, 1997.

Peak Technologies, Inc. Web Page, http://www.peakJet/PeakJet.html, printed May 20, 1997.

Relay Web Page, http://www.relay.com/product/gold.html, printed on May 22, 1997.

Relay Web Page, http://www.relay.com/product/otg.html, printed on May 22, 1997.

Sequel Technology Web Page, http://www.sequeltech.com/product/netPIM/prodinfo.html, printed on May 22, 1997.

Stac Inc. Web Page, http://www.stac.com/replica/pr–legato-agreement.html, printed on May 22, 1997.

Wilson, Andrew W., "Organization and Statistical Simulation of Hierarchical Multiprocessors," UMI Dissertation Information Service (1985).

Li, Kai, "Shared Virtual Memory on Loosely Coupled Multiprocessors," Yale University, Department of Computer Science, (Sep., 1986).

Wilson, Andrew W., "Hierarchical Cache/Bus Architecture for Shared Memory Multiprocessors," *ACM,* pp. 244–252 (1987).

Carter, J.B. et al., "Optimistic Implementation of Bulk Data Transfer Protocols," *In Proceedings of the 1989 Signetrics Conference,* pp. 61–69 (May, 1989).

Carter, J.B. et als., "Distributed Operating Systems Based on a Protected Global Virtual Address Space," In the Proceedings of the Third Workshop on Workstation Operating Systems (WWOS) (May, 1992).

Carter, J.B. et als., "FLEX: A Tool for Building Efficient and Flexible Systems," In the Proceedings of the Fourth Workshop on Workstation Operating Systems ((WWOS) (Oct., 1993).

Carter, John B., "Design of the Munin Distributed Shared memory System," To appear in the special issue of the *Journal of Parallel and Distributed Computing* on distributed shared memory (1995).

Carter, J.B. et als., "Techniques for Reducing Consistency–Related Communication in Distributed Shared Memory Systems," *ACM Transactions on Computer Systems,* pp. 205–243, vol. 13, No. 3 (Aug., 1995).

Carter, J.B. et als., "Reducing Consistency Traffic and Cache Misses in the Avalanche Multiprocessor," University of Utah technical report.

Web page of Tricord Systems, Inc., http://www.tricord.com/2/10–3–96.html, printed on May 22, 1997.

Web page of Network Appliance, Inc., http://www.netapp.com/products/level3/nfs.html, printed on May 22, 1997.

Web page of Network Appliance, Inc., http://www.netapp.com/products/level3/ontap.html, printed on May 22, 1997.

Web page of Network Appliance, Inc., http://www.netapp.com/products/level3/windows.html, printed on May 22, 1997.

STRUCTURED DATA STORAGE USING GLOBALLY ADDRESSABLE MEMORY

CROSS-REFERENCE TO RELATED APPLICATION

This application is a continuation-in-part of co-pending U.S. patent application Ser. No. 08/754,481 filed Nov. 22, 1996 now pending, which is incorporated herein by reference in its entirety and which is owned by the assignee of this application.

TECHNICAL FIELD

The present invention relates in general to structured storage systems (e.g., file systems, database systems, and systems for storing, sharing, and delivering data objects, JAVA applets, and Web pages). More specifically, the invention relates to systems and methods that maintain a structured store of data, preferably within a distributed, addressable, shared memory space.

BACKGROUND INFORMATION

Computer based structured storage systems, such as computer file systems and database systems, have been remarkably successful at providing users with quick and facile access to enormous amounts of data. The importance of these structured storage systems in today's commerce is difficult to exaggerate. For example, structured storage systems have allowed businesses to generate and maintain enormous stores of persistent data that the company can modify and update over the course of years. For many companies, this persistent data is a valuable capital asset that is employed each day to perform the company's core operations. The data can be, for example, computer files (e.g., source code, wordprocessing documents, etc.), database records and information (e.g., information on employees, customers, and/or products), and/or Web pages.

A typical computer based structured storage system includes a central server, such as a file system server or a database system server, that provides centralized control over the structured store of data. The structured store of data is the information that is being maintained by the system, such as the information in the files and the directories of the file system or within the rows and columns of the tables of the database system. The central server provides system services to a plurality of interconnected network client nodes, and each of the client nodes employs the central server to access and manipulate the structured store of data. Accordingly, the central server provides a nucleus for the structured storage system and maintains central control over the system and the data stored therein.

Although such server based systems have worked generally well, problems arise from relying on centralized control of the structured data store. For example, the operation of the structured storage system is dependent upon the proper functioning of the central server. Any failure of the server to maintain proper operation, such as a power failure, hardware failure, or other such system failure, will disable the entire structured storage system and prevent users from accessing the data store. Additionally, a flood of client service requests issued from the individual network nodes can overload the server process and slow down or crash the system. Accordingly, reliance on centralized control of the structured storage system can result in slow operation during periods of heavy use, as well as result in system failures due to overloading the central server.

An additional problem with a client-server network system is that it provides a static operating environment that is set for optimal performance at a certain level of network activity. Consequently, the network fails to exploit available resources to improve system performance. In particular, as the system activity rises above or drops below the expected level of network activity, the static operating environment lacks any ability to reconfigure dynamically the allocation of network resources to one providing better performance for the present level of activity.

Technology has been developed to improve the reliability and operation of these centralized structured storage network systems. This technology has been mostly directed to the development of reliable database and file systems, and has generally involved one of two methods: (1) static mapping of the data to one or more servers, or (2) storing the data in a globally shared data repository, such as a shared disk.

Systems using the first method distribute portions of the structured store of persistent data statically across a plurality of servers. Each of the servers maintains a portion of the structured store of data, as well as optionally maintaining an associated portion of a directory structure that describes the portions of the data stored within that particular server. These systems guard against a loss of data by distributing the storage of data statically across a plurality of servers such that the failure of any one server will result in a loss of only a portion of the overall data. Other developments in clustered database technology provide for replicating portions of the structured store of data, and storing the replicated portions statically across a plurality of servers. Accordingly, these systems go further in guarding against the loss of data by providing static redundancy within the structured storage system. However, although known clustered database technology can provide more fault tolerant operation in that it guards against data loss, the known systems still rely on static allocation of the data across various servers. Since data is not dynamically allocated between servers: (1) system resources are not allocated based on system usage which results in under utilization of those resources; (2) scaleable performance is limited because new servers must be provided whenever the dataset grows or whenever one particular server cannot service requests made to its portion of the dataset; and (3) such static allocation still requires at least one of servers storing the information to survive in order to preserve the data.

Systems using the second method store the structured data in central data repository, such as a shared disk. Each node in the system continually updates the central data repository with its portion of the structured store. For example, in a database system, each node exports tables it is currently using to the data store. While this method exports the problems of load balancing to the central data repository, it suffers from two main drawbacks. First, throughput is lowered because of increased overhead associated with ensuring coherency of the centralized data store. Second, locking is inefficient because entire pages are locked when a node accesses any portion of a page. As a result, nodes may experience contention for memory even when no true conflict exists.

SUMMARY OF THE INVENTION

It is an object of the invention to provide improved storage systems for maintaining a structured store of data.

It is a further object of the invention to provide structured storage systems that are more reliable, provide greater fault tolerant operation, and have the ability to dynamically move data in response to network activity levels and access patterns in order to optimize performance and minimize node access times.

It is yet another object of the invention to provide structured storage systems that provide distributed control over a structured store of persistent data, where the data can include, for example, computer files, database records and information, or Web pages.

It is still a further object of the invention to provide distributed control to a plurality of different types of structured storage systems, such as file systems, database systems, and systems that store, share, and deliver Web pages to requesting nodes and/or requesting networks.

Further objects of the invention will, in part, be described and, in part, be apparent to those of ordinary skill from the following description and the accompanying drawings.

The invention can be understood as structured storage systems, and related methods, that employ a globally addressable unstructured memory system to maintain a structured store of persistent data within a shared memory space. Optionally, a shared memory system can be employed, such as a distributed shared memory system (DSM) that distributes the storage of data across some or all of the memory devices connected to a network. Memory devices that may be connected to the network include hard disk drives, tape drives, floppy disk drive, CD-ROM drives, optical disk drives, random access memory chips, or read-only memory chips.

The structured storage system can be a computer program that interfaces to a DSM to operate the DSM as a memory device that provides persistent storage of data. The structured storage system control program can direct the DSM to map file and directory data into the shared memory space. The DSM can include functionality to share data and coherently replicate data. In one embodiment, the DSM provides memory device services to the data control program. These services can include read, write, allocate, flush, or any other similar or additional service suitable for providing low level control of a memory storage device. The data control program employs these DSM services to allocate and access portions of the shared memory space for creating and manipulating a structured store of persistent data.

In one aspect, the invention relates to a method, and related system, for providing distributed control over a structured store of data. The method involves providing a plurality of nodes inter-connected by a network, and storing on each the node an instance of a data control program for manipulating the structured store of data to provide multiple, distributed instances of the data control program. The method also involves interfacing each the instance of the data control program to a shared memory system that provides addressable persistent storage of data, and operating each the instance of the data control program to employ the shared memory system as a memory device having the structured store of data contained therein, whereby the shared memory system coordinates access to the structured store of data to provide distributed control over the structured store of data.

Embodiments of this aspect of the invention include interfacing each the instance of the data control program to a DSM that provides distributed storage across the interconnected nodes and that provides persistent storage of data. The interface step can further include directing the data control program to provide a stream of data to be stored in the structured store of data and directing the data control program to operate the shared memory system as a single-node memory device.

Other embodiments of this aspect of the invention include operating the shared memory system to replicate stored data coherently to provide a redundant store of data, and storing the coherently replicated data within different storage devices of the network to provide fault tolerant operation. Also included is coordinating shared access to data within the structured store by locking objects stored within a shared memory space, and generating a lock object data structure having information representative of a lock status on portions of the shared memory space and storing the lock object within the shared memory space to provide a shared system lock. Objects can be locked by directing the shared memory to generate locks on portions of the shared memory space. Also, the data control program can compress data to be stored in the structured store of data.

Still other embodiments according to this aspect of the invention include embodiments in which the structured store of data comprises a file system, a database system, a Web page system, or generally any object storing, retrieving, manipulating, and supplying the system. For the file system embodiment, the data control program comprises a file control program for manipulating the file system whereby the shared memory system controls access to the file system to provide a shared file system. For the database system embodiment, the data control program comprises a database control program for manipulating the database system, whereby the shared memory system controls access to the database system to provide a shared database system. For the Web page system embodiment, the data control program comprises a Web page control program for manipulating the Web page system, whereby the shared memory system controls access to the Web page system to provide a shared Web page system. For any of these particular embodiments, the shared system uses a directory and operates the shared memory system to maintain the directory within a shared memory space, and the directory is organized as a plurality of sets stored within the shared memory space. Also, for an object (e.g., file, database record, Web page, etc.) stored within the shared system, a descriptor is generated that has storage for a identifier being representative of a portion of a shared memory space, and contiguous portions of the shared memory space can be allocated, each represented by a respective identifier, to provide reduced bookkeeping information for the respective file and to optimize access to physical storage for the file.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

A network system 10 according to the invention includes a plurality of network nodes that access a memory space storing a structured store of data, such as a structured file system or a database. Each of the nodes includes at least a data control program which accesses and manages the structured store of data. The structured store of data may be stored in an addressable shared memory or the structured store may be stored in a more traditional fashion. For example, each node may be responsible for storing a particular element or elements of the structured store of data. In such an embodiment, the data control program can access a desired portion of the structured store using a globally unique identifier. The underlying system would translate the identifier into one or more commands for accessing the desired data, including network transfer commands. In another embodiment, the structured store of data is stored in an addressable shared memory space, which allows the nodes to transparently access portions of the structured store using standard memory access commands.

The system 10 can be a file system, a database system, a Web server, an object repository system, or any other structured storage system that maintains an organized set of data. As used herein, the term "Web server" means any processor which transmits data objects (such as Active X objects), applications (such as JAVA applets), or files (such as HTNL files), to a requestor via Web protocols (e.g., http or ftp). In one disclosed embodiment, the system 10 is a file system that maintains various computer files. However, this is just one embodiment of the invention that is provided for illustrative purposes. The invention can be employed to provide any one of a plurality of structured storage systems (e.g., database system, Web page system, Intranet, etc.). The invention is not to be limited to the file system or other particular embodiments described herein.

Figure 1:
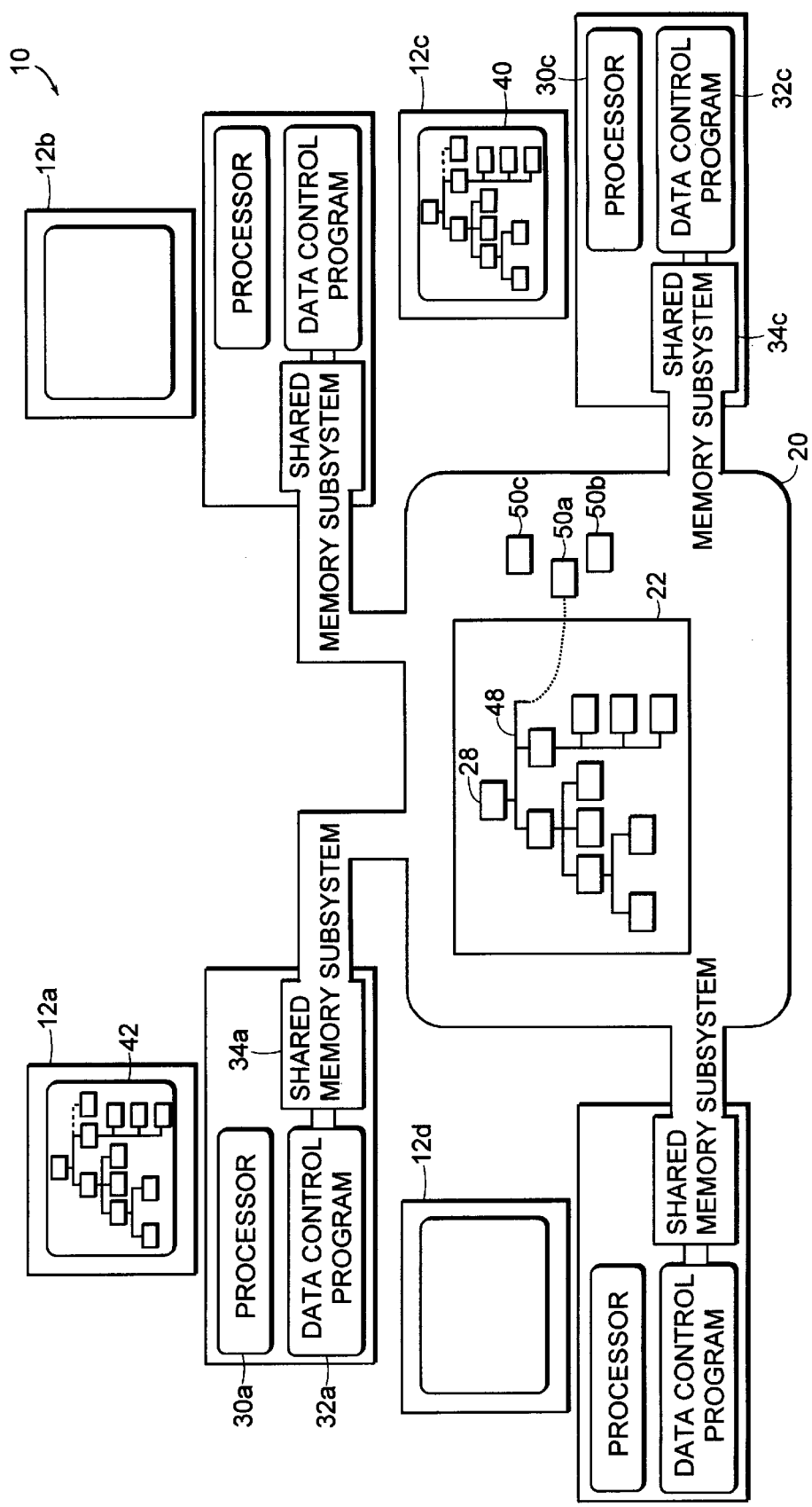
FIG. 1 is a conceptual block diagram of a distributed addressable shared memory structured data storage system according to the invention.

Referring to FIG. 1, a network system 10 according to the invention includes a plurality of network nodes 12a–12d and an addressable shared memory space 20 that has a portion 22 for storing a structured store of data 28. Each of the nodes 12a–12d can include several sub-elements. For example, node 12a includes a processor 30a, a data control program 32a, and a shared memory subsystem 34a. In the disclosed embodiment, two of the nodes, 12a and 12c, include monitors that provide displays 40 and 42 graphically depicting the structured store of data 28 within the addressable shared memory space 20. The addressable shared memory space 20 interconnects each of the network nodes 12a–12d and provides each node 12a–12d with access to the structured store of data 28 contained within the addressable shared memory space 20.

A system 10 according to the invention can provide, among other things, each network node 12a–12d with shared control over the structured store of data 28 and, therefore, the system 10 can distribute control of the data store across the nodes of the network. To this end, each node of the system 10, such as node 12a, includes a data control program 32a that interfaces to a shared memory subsystem 34a. The data control program 32a can operate as a structured storage system, such as a file system, that is adapted to maintain a structured store of data and to employ the shared memory system as an addressable memory device that can store a structured store of data. At the direction of the data control program 32a, the shared memory subsystem 34a can access and store data within the addressable shared memory space 20. These cooperating elements provide a structured storage system that has a distributed architecture and thereby achieves greater fault tolerance, reliability, and flexibility than known structured storage systems that rely on centralized control and centralized servers. Accordingly, the invention can provide computer networks with distributively controlled and readily scaled file systems, database systems, Web page systems, object repositories, data caching systems, or any other structured storage system.

Still referring to FIG. 1, the system 10 of the invention maintains within the addressable shared memory space 20 a structured store of data 28. Each of the nodes 12a–12d can access the addressable shared memory space 20 through the shared memory subsystems 34a–34d. Each of the shared memory subsystems 34a–34d provides its node with access to the addressable shared memory space 20. The shared memory subsystems 34a–34d coordinate each of the respective node's memory access operations to provide access to the desired data and maintain data coherency within the addressable shared memory space 20. This allows the interconnected nodes 12a–12d to employ the addressable shared memory space 20 as a space for storing and retrieving data. At least a portion of the addressable shared memory space 20 is supported by a physical memory system that provides persistent storage of data. For example, a portion of the addressable shared memory space 20 can be assigned or mapped to one or more hard disk drives that are on the network or associated with one or more of the network nodes 12a–12d as local hard disk storage for those particular nodes. Accordingly, FIG. 1 illustrates that systems of the invention have shared memory subsystems providing the network nodes with access to an addressable shared memory space, wherein at least a portion of that space is assigned to at least a portion of one or more of the persistent storage memory devices (e.g., hard disks) to allow the nodes addressably to store and retrieve data to and from the one or more persistent storage memory devices. A preferred embodiment of such an addressable shared memory space is described in the commonly-owned U.S. patent application Ser. No. 08/754,481 filed Nov. 22, 1996, and incorporated by reference above.

Therefore, one realization of the present invention is that each of the nodes 12a–12d can employ its respective shared memory subsystem as a memory device that provides persistent data storage.

Each of the data control programs 32a–32d is a software module that couples to the respective shared memory subsystem 34a–34d in a way that operates similarly to an interface between a conventional data storage program and a local memory device. For example, the data control program 32a can stream data to, and collect data from, the shared memory subsystem 34a. Because the shared memory subsystems coordinate the memory accesses to the addressable shared memory space 20, each of the data control programs is relieved from having to manage and coordinate its activities with the other data control programs on the network or from having to manage and coordinate its activities with one or more central servers. Accordingly, each of the data control programs 32a–32d can be a peer incarnation (i.e., an instance) residing on a different one of the network nodes 12a–12d and can treat the respective shared memory subsystem 34a–34d as a local memory device such as a local hard disk.

One or more of the data control programs 32a–32d can provide a graphical user interface 42 that graphically depicts the structured store of data 28 contained within the addressable shared memory space 20. The graphical user interface 42 allows a user at a node, for example at node 12a, to insert data objects graphically within the structured store of data 28. To this end, the data control program 32a can generate a set of commands that will present a stream of data to the shared memory subsystem 34a and the shared memory subsystem 34a will employ the data stream to store an object within the structured store of data 28. Similarly, the other shared memory subsystems 34b–34d can provide information to their respective nodes that is indicative of this change to the structured store of data 28. Accordingly, as shown depicted in FIG. 1 for node 12c only for simplicity, that node (which includes a graphical user interface 40) reflects the change to the structured store of data 28 affected by the data control program 32a of the node 12a. In particular, the graphical user interface 40 of the node 12c can depict to a user that an object is being placed within the structured store of data 28. For example, the addressable shared memory space 20 also contains the data objects 50a–50c which can be placed within the structured data store 28 to become part of that structured data store. As illustrated, a system user at node 12a can direct object 50a to be inserted at a set location within the data store 28. The data control program 32a then directs the shared memory subsystem 34a to place the object 50a within the data store 28 at the proper location. Moreover, the shared memory subsystem 34c on node 12c detects the change within the data store 28 and reflects that change within the graphical user interface 40.

Figure 2:
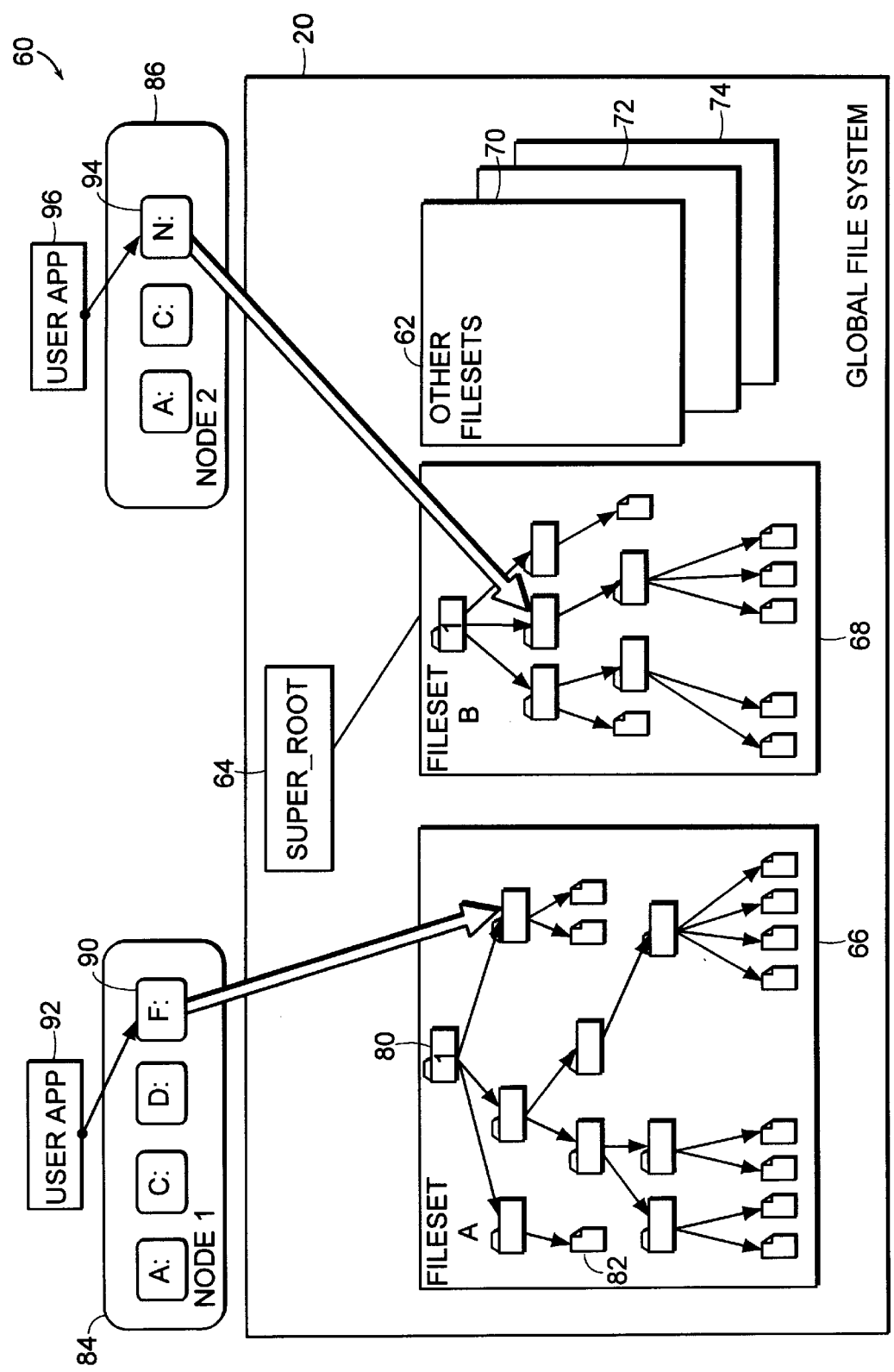
FIG. 2 is a diagram of one possible embodiment of the system of FIG. 1, namely a distributed addressable shared memory file system providing storage for computer files such as source code files, wordprocessing documents files, etc.

Referring now to FIG. 2, a structured file system 60 is a particular embodiment according to the invention that employs the properties of the addressable shared memory space 20 to implement what looks to all network nodes like a coherent, single file system when in fact it spans all network nodes coupled to the addressable shared memory space 20.

The file system 60 of FIG. 2 differs from known physical and distributed file systems in a variety of ways. In contrast to known physical file systems which map a file organization onto disk blocks, the file system 60 according to the invention manages the mapping of a directory and file structure onto a distributed addressable shared memory system 20 which has at least a portion of its addressable space mapped or assigned to at least a portion of one or more persistent storage devices (e.g., hard disks) on the network. Unlike known distributed file systems, the file system 60 of the invention employs peer nodes, each of which have an incarnation or instance of the same data control program. Also, unlike known file systems generally, the file system 60 of the invention: maintains data coherence among network nodes; automatically replicates data for redundancy and fault tolerance; automatically and dynamically migrates data to account for varying network usage and traffic patterns; and provides a variety of other advantages and advances, some of which are disclosed in the commonly-owned U.S. patent application Ser. No. 08/754,481 filed Nov. 22, 1996, and incorporated by reference above.

Still referring to FIG. 2, the file system 60 resides in part within the addressable shared memory space 20, and includes a structured store of data 62, a super root 64, file sets 66–74, directory entry 80, and file or document 82. Two network nodes 84 and 86 are shown accessing the addressable shared memory space 20 (in the manner described previously with reference to FIG. 1) via the logical drives 90 and 94. Application programs 92 and 96 executing on the nodes interact with the data control programs (not shown in FIG. 2 but shown in FIG. 1 as 32a–32d) and cause the data control programs in the nodes to access the logical drives 90 and 94. In the disclosed embodiment, the logical drives are DOS devices that "connect to" the fileset directories via Installable File System drivers associated with the file system 60.

The file system 60 supports one global file system per addressable shared memory space 20 shared by all of the network nodes. This global file system is organized into one or more independent collections of files, depicted as the filesets 66–74. A fileset can be thought as logically equivalent to a traditional file system partition. It is a collection of files organized hierarchically as a directory tree structure rooted in a root directory. The non-leaf nodes in the tree are the directories 80, and the leaves in the tree are regular files 82 or empty directories. Sub-directory trees within a fileset can overlap by linking a file to multiple directories.

A benefit of breaking up the file system 60 into filesets 66–74 is that it provides more flexible file system management for users of the system 60. As the file system 60 grows into very large sizes (e.g., hundreds of nodes with thousands of gigabits of storage), it is desirable to have the files organized into groups of management entities such that management actions can be independently applied to individual groups without affecting the operation of the others.

The filesets in the addressable shared memory space 20 are described and enumerated in a common structure, the root 64 of which provides the starting point to locate the filesets in the addressable shared memory space 20. The root 64 can be stored in a static and well-known memory location in the addressable shared memory space 20, and it can be accessed via a distributed shared memory system program interface. When a node is accessing a fileset for the first time, it first looks up the root 64 to determine the identifier associated with the fileset, e.g., the shared memory address used to access the fileset. Once it has determined the identifier, the node can access the root directory of the fileset. From the root directory, it then can traverse the entire fileset directory tree to locate the desired file. Filesets used by the file system 60 are described in greater detail below under the heading "Fileset."

Figure 3:
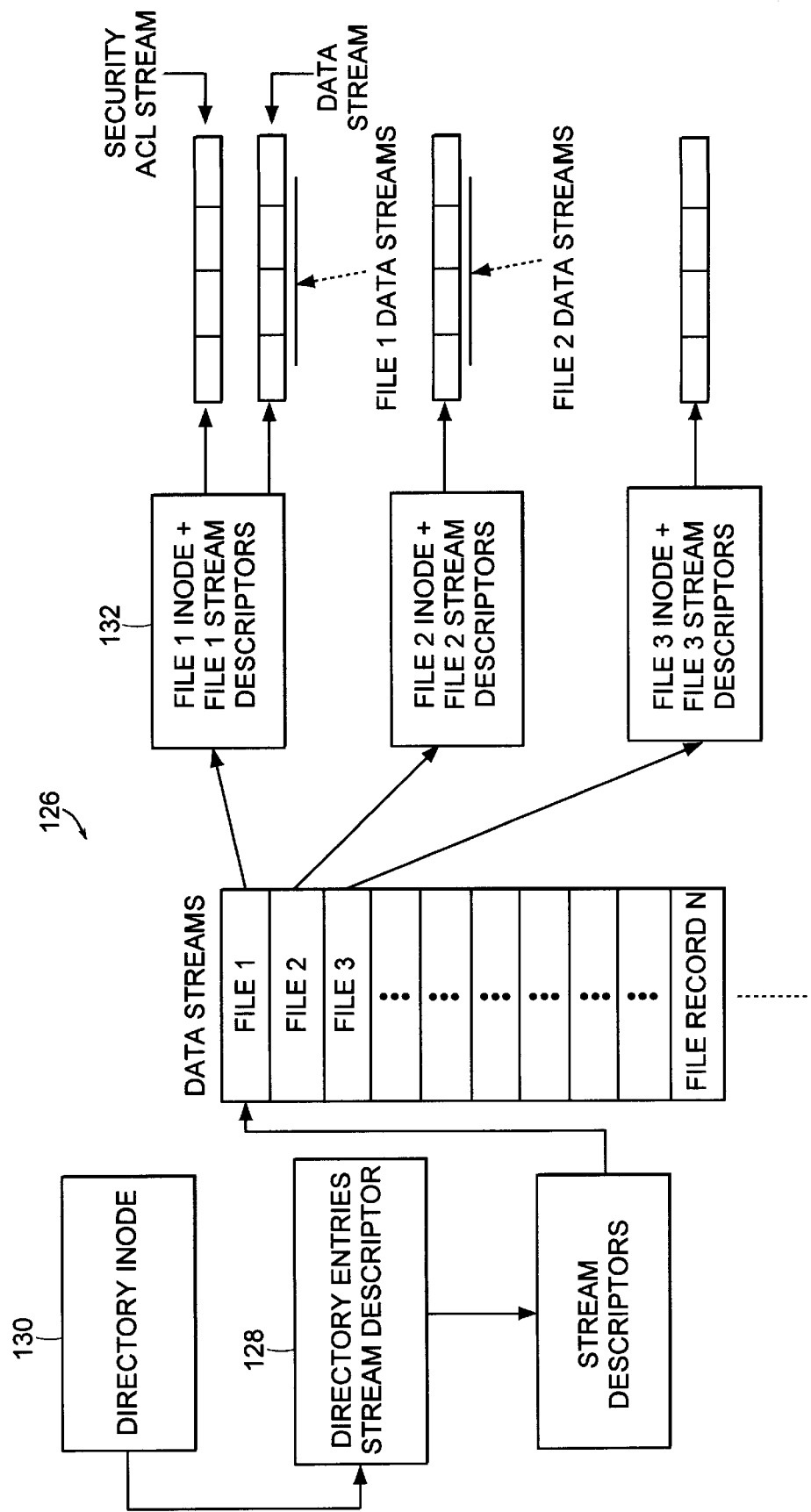
FIG. 3 is a graphical representation of the organization of directory entries and associated file descriptors (also known as "Inodes"), suitable for use with the file system of FIG. 2.

Referring to FIG. 3, in the disclosed embodiment of the file system 60 according to the invention, a directory 126 (such as the directory 80 of FIG. 2) is accessed by starting at a directory Inode or descriptor 128 containing an address that points to a directory entries stream descriptor 130. This descriptor 130 is a pointer to a block of data containing directory entries for files File 1 through File 3. The directory entry for File 1 has a number of entries; one of the entries is a string containing the name of the file and another entry is the address of the Inodes and stream descriptors 132. The stream descriptors for File 1 are used to locate and retrieve the various 4 kilobyte pages in the addressable shared memory space 20 that constitute File 1. Other files are retrieved and constructed from the addressable shared memory space 20 in the same fashion. The directories used by the file system 60 are described in greater detail below under the heading "Directory."

Figure 4:
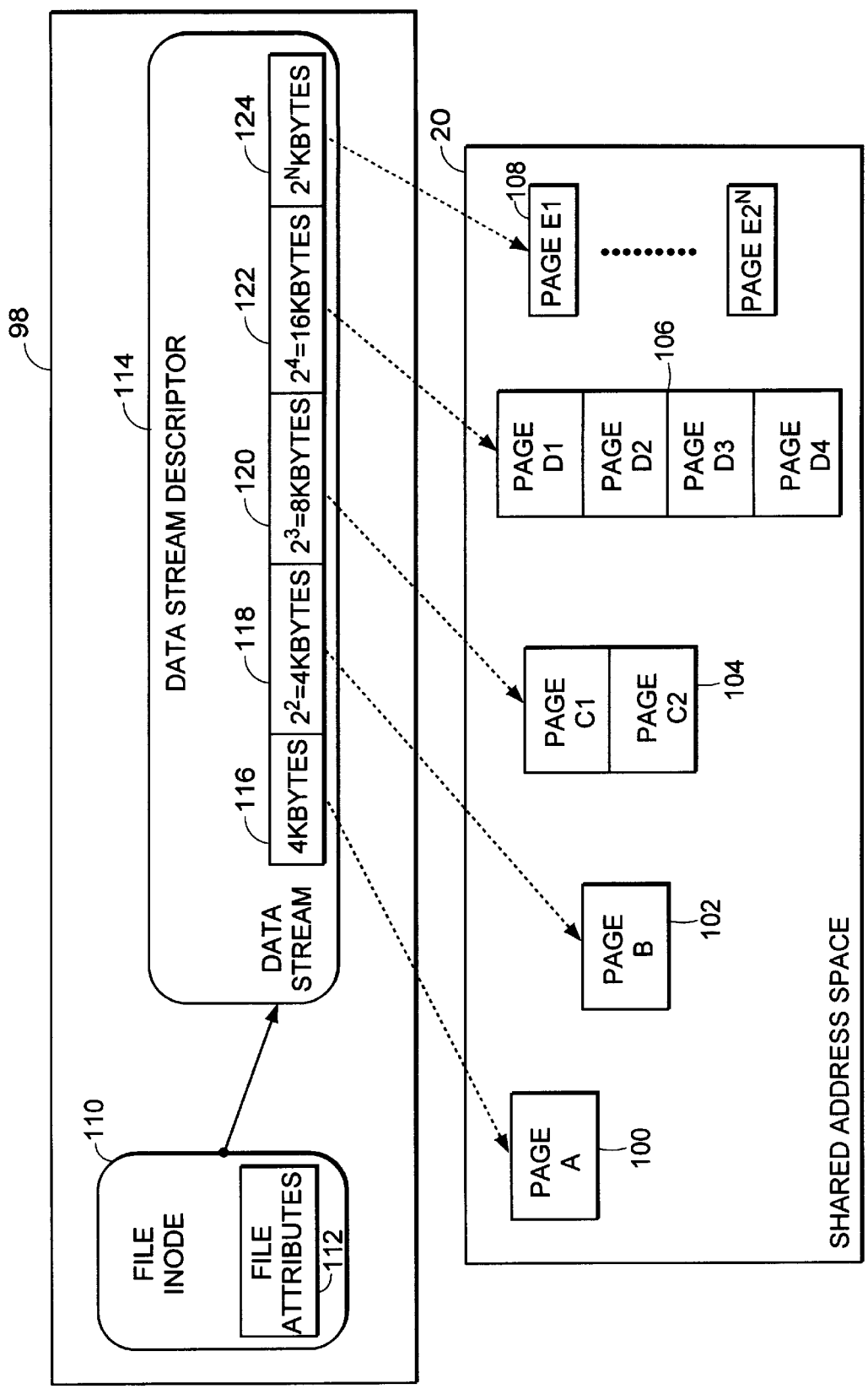
FIG. 4 is a diagram of an Inode suitable for use with the file system of FIG. 2.

In the embodiment of the file system 60 disclosed in FIG. 4, a file 98 (such as the file 82 of FIG. 2) is represented by one or more shared pages of data 100, 102, 104, 106, and 108 in the addressable shared memory space 20. Each file 98 has a file Inode or descriptor 110 that includes various file attributes 112. The file descriptor 110 contains an address that points to a data stream descriptor 114, and the data stream itself includes one or more addresses 116, 118, 120, 122, and 124 that point to particular pages in the identifiable shared memory space 20. In the disclosed embodiment, a page is the atomic unit in the addressable shared memory space 20, and it contains up to 4 kilobytes of data. Even if the entire 4 kbytes is not needed, an entire page is used. This is illustrated by the page 108 that only contains about 2 kbytes of data. The files used by the file system 60 are described in greater detail below under the heading "Files."

FILESET

The filesets are the basic unit for the file system 60. Each fileset is identified with a name having up to 255 characters. The file system 60 exports a set of fileset level operations that allow an administrator to manage the filesets through the following type of actions.

Fileset Creation

This operation creates a new fileset. The fileset is initially created with one file, the empty root directory. A default fileset is created automatically at the initialization of the addressable shared memory space 20.

Fileset Deletion

This operation deletes a fileset. All files in the fileset are removed, and all shared memory space allocated to the files in the fileset is discarded and the backing physical storage freed for new storage. The file system 60 will only allow deletion of a fileset until there are no open handles to file data stream in the fileset. In order to ready a fileset for deletion, the fileset must be "shutdown" by putting it off-line.

Fileset Enumeration

This operation enumerates a specific fileset, or all the filesets, in the addressable shared memory space 20.

Fileset Control

This operation performs fileset level control routines such as setting fileset attributes.

Mount Export Control

Directory are attached to local devices, i.e. "mounted" using parameters stored in the Windows NT registry, or some other similar central storage area for such information. When first started up, the data control program 60 accesses the central storage and determines which filesets should be mounted. The data control program creates a file object representing each fileset identified by the entries in the central storage. In some embodiments an API may be provided which allows the data control program 60 to dynamically mount and unmount filesets by making appropriate API calls.

The users of the file system 60 are not aware of the shared memory "logical volume," but rather view each fileset as a volume (or partition in the sense of a traditional physical file system). The Win32 GetVolumeInformation is used to get information on the fileset (more precisely, on the logical device on which the fileset is attached to). Because all the filesets share the same pool of the storage in the addressable shared memory space 20, the total volume size returned to the user for each fileset is the current aggregate storage capacity in the addressable shared memory space 20. The same approach is taken for the total free space information, and the aggregate value of the addressable shared memory space 20 is returned for each fileset.

DIRECTORY

Directory entry scanning is one of the most frequently performed operations by user applications. It is also may be the most visible operation in terms of performance. Consequently, much attention is directed to making the directory scan efficient and the WindowsNT Files System (NTFS) duplicates sufficient file Inode information in the directory entry such that a read directory operation can be satisfied by scanning and reading the directory entries without going out to read the information from the file Inodes. The problem with this scheme is that the doubly stored file metadata, such as the file time stamps and file size, can be updated quite frequently, making the metadata update more expensive. However, this overhead is considered acceptable in face of the performance gained in directory scan operations.

The file system 60 adopts the same philosophy of providing efficient directory scanning by duplicating file Inode information in directory entries. Each directory entry contains sufficient information to satisfy the Win32 query file information requests. The file Inode is stored with the file stream descriptors on a separate page. The Inode is located via a pointer in the directory entry.

The file system's directory entries are stored in the directory file's directory entry data stream. To maximize space utilization, each directory entry is allocated on the first available free space in a page that can hold the entire entry. The length of the entry varies depending on the length of the file's primary name. The following information is part of the directory entry: creation time; change time; last write time; last accessed time; pointers to stream descriptor; pointer to parent directory Inode; MS-DOS type file attributes; and MS-DOS style file name (8.3 naming convention). For average file name lengths, a page contains up to about 30 entries. All the file information in the directory entry is also contained in the file Inode, except for the file primary name and MS-DOS file name. The file primary names and associated short names are only stored in the directory entries. This makes the Inode size fixed.

When a file information is modified (except for file names), the Inode is updated in the context of the update transaction and therefore always contains the most up-to-date information. The associated directory entry change is lazily flushed to reduce the cost of double updating. This means the Inode updates are either flushed or recoverable, but not the corresponding directory entry updates. If the directory entry gets out of synch with the Inode (when the Inode change is successfully flushed but not the directory change), the entry is updated the next time the Inode is updated. In order to facilitate synchronization of directory updates, the directory entries (Inodes) can not span multiple pages. FIG. 3 illustrates the organization of directory entries and associated Inodes.

FILES

A file of the file system 60 comprises streams of data and the file system metadata to describe the file. Files are described in the file system 60 by objects called Inodes. The Inode is a data structure that stores the file metadata. It represents the file in the file system 60.

A data stream is a logically contiguous stream of bytes. It can be the data stored by applications or the internal information stored by the file system 60. The data streams are mapped onto pages allocated from the addressable shared memory space 20 for storage. The file system 60 segments a data stream into a sequence of 4 kilobyte segments, each segment corresponding to a page. The file system 60 maintains two pieces of size information per data stream: the number of bytes in the data stream; and the allocation size in number of pages. The byte-stream to segment/page mapping information is part of the file metadata and is stored in a structure called data stream descriptor. See FIG. 4.

Users' requests for data are specified in terms of range of bytes and the position of the starting byte measured by its offset from the beginning of the data stream, byte position zero. The file system 60 maps the offset into the page containing the starting byte and the intra-page offset from the beginning of the page.

Every file of the file system 60 has at least two data streams: the default data stream; and the Access Control List (ACL) stream. Each file may optionally have other data streams. The ACL stream is used to store the security Access Control Lists set on the file. Each data stream is individually named so that the user can create or open access to a specific data stream. The name of the default data stream is assumed to be the primary name of the file. To access a data stream, the user of the file system 60 must first open a file handle to the desired data stream by name. If the file name is used then the handle to the default data stream is opened. This open file handle represents the data stream in all the file system services that operates on the data stream.

The file system 60 exports a set of services to operate at the file level. The input to the services are the file object handle (Inode) or the data stream object handle, and the operation specific parameters, including the desired portions of the data stream in byte positions.

Open files are represented by data stream objects (or just file objects). Users access files using these file objects, identified to the users through file handles. A file handle is a 32-bit entity representing an instance of an open file stream. For example, WindowsNT creates the file object and returns a file handle to the users in response to the user request for file creation or file open. The file system 60 initializes a pointer to a file control block. Multiple file objects point to the same file control block and each file control block maintains separate stream objects for each open context. Externally, the file handle is opaque to the users. Multiple opens can be issued against the same file. When the user closes a file, the file object and the associated file handle is removed.

The file system 60 maps file streams into sequences of segments which become progressively larger; each segment corresponds to one or more pages. The file system 60 attempts to reserve contiguous pages for data streams but only allocates real backing storage on an as needed basis, usually as a result of a file extension requested by writing beyond the data stream allocation size. When a file extension request is received, the file system 60 rounds the extension size in number of bytes up to a multiple of 4 kilobytes to make it an integer number of pages, and requests pages for actual allocation. The number of 4 kilobyte pages allocated by the file system depends on the number of file extension requests made. The file system 60 allocate one 4 kilobyte page for the first extension request, two 4 kilobyte pages for the second request, four 4 kilobyte pages for the third extension request, and so on. The newly allocated pages are zero filled. By reserving contiguous pages, the file system 60 can reduce the amount of bookkeeping information on the byte offset to page mapping. The file system 60 reserves (sometimes much) larger than requested memory space for a file, and substantiates the storage by allocating backing storage page by page.

Four kilobyte allocation segments are chosen to reduce the unused storage space and yet provide a reasonable allocation size for usual file extensions. Since allocation is an expensive operation (most likely involving distributed operations), smaller allocation size is not efficient. Larger allocation size would lead to inefficient space utilization, or additional complexity to manage unused space. A 4 kilobyte segment also maps naturally to a page, simplifying the data stream segment to page mapping. Although an analogy could be made with the NTFS's allocation policy of 4 kilobyte clusters (segment) size for large disks to speed up allocation and reduce fragmentation, such analogy is not completely valid because the actual on-disk allocation segment size depends greatly on the local disk size and the physical file systems.

Similar to the NTFS, which controls the allocation of each disk partition and therefore can quickly determine the free volume space available for allocation, the file system 60 requests the total available space information and uses this information to quickly determine whether to proceed with the allocation processing. If the total available space is less than the required allocation size, the request is denied immediately. Otherwise, the file system 60 will proceed to allocate the pages to satisfy the request. The fact that the file system 60 can proceed with the allocation does not guarantee that the allocation will succeed, because the actual total available space may change constantly.

The file system 60 takes advantage of the page level replication capability of the underlying distributed addressable shared memory system 20 disclosed in the U.S. patent application incorporated by reference above. Page level replication allows the system to provide file replication. The data streams of a replicated file are backed by pages, which are themselves replicated. In this way, data streams are replicated automatically without intervention of the file system 60. The extra space consumed by the multiple replicas is not reflected in the file (data stream) sizes. The stream allocation size still reports the total allocation size in pages required for one replica. The pages backing temporary files, however, are not replicated.

FILE ACCESS AND RESOURCE SHARING - LOCKING

The shared memory provides the distribution mechanism for resource sharing among peer nodes running the file system 60 software. Each instance of the file system 60 on each network node views the shared memory resources (i.e., pages) as being shared with other local or remote threads. The file system 60 needs a way to implement high level, file system locks to provide consistent resource sharing. Any concurrency control structure can be used to implement locks, such as lock objects or semaphores. In database applications, locking may also be achieved by implementing concurrency control structures associated with database indices or keys. In file system applications access to files or directories may be controlled. Another example of file system locks is Byte Range Locking, which provides the users the ability to coordinate shared access to files. A byte range lock is a lock set on a range of bytes of a file. Coordinated shared access to a file can be accomplished by taking locks on the desired byte ranges. In general, the high level file system lock works in the following fashion: (a) a file system resource is to be shared by each file system 60 instance, and the access to the resource is coordinated by a locking protocol using a lock object data structure that represents the high level lock to coordinate the shared resource, and it is the value of the data structure that represents the current state of the lock; (b) to access the resource, the instance at each node must be able to look at the state (or value) of the lock data structure, and if it is "free," modify it so that it becomes "busy," but if it is "busy," then it has to wait to become "free," and there could be intermediate states between "free" and "busy" (i.e., more than two lock states), but in any event, in this byte range locking example, a lock is a description of a certain byte range being shared/exclusively locked by some thread of the file system 60, and a conflicting new byte range lock request that falls in or overlaps the already locked byte range will be denied or the requester may block (depending on how the request was made); and (c) access to or modification of the lock data structure by each node's instance needs to be serialized so that it in turn can then be used to coordinate high level resource sharing.

The locking features and capabilities of the shared memory engine described in the U.S. patent application Ser. No. 08/754,481, incorporated by reference above, allow the file system 60 to coordinate access to pages. The engine can also be used to coordinate access to resources, but in the case of complex high level resource locking such as Byte Range Locking, using the engine's locking features and capabilities directly to provide locks may be too costly for the following reasons: (a) each byte range lock would require a page representing the lock, and since the number of byte range locks can be large, the cost in terms of page consumption may be too high; and (b) the engine locks only provide two lock states (i.e., shared and exclusive), and high level file system locks may require more lock states.

The file system 60 of the invention implements the file system locking using the engine locking as a primitive to provide serialization to access and update the lock data structures. To read a lock structure, the file system 60 takes a shared lock on the data structure's page using the engine locking features and capabilities before it reads the page to prevent the data structure being modified. To modify the lock structure, it sets a exclusive lock on the page. The page lock is taken and released as soon as the lock structure value is read or modified.

With the serialization provided by the page locking and the page invalidation notification, the file system 60 implements the high level locks in the following way: (a) to take a file system lock (FS lock), the file system 60 sets a shared lock on the FS lock page and reads the page and then examines the lock structure; (b) if the lock structure indicates the resource is unlocked or locked in compatible lock mode, then the file system 60 requests to exclusively lock the page, and this guarantees only one file system 60 node instance can modify the lock data structure, and if the request succeeds then the file system 60 write maps the lock page and then changes the lock structure to set the lock and unlocks the page and sets page access to none; and (c) if the resource is locked in incompatible lock mode, the file system 60 unlocks the page but retains the page read mapped, and it then puts itself (the current thread) in a queue and waits for a system event notifying that the lock value has changed, and when the lock value does change then the file system 60 thread gets notified and repeats the step (a) above. The file system 60 implements the notification using a signal primitive. The file system 60 threads waiting for a lock are blocked on a system event. When the page containing the lock changes, a signal is sent to each blocked file system 60 thread. Each blocked file system 60 threads then wakes up and repeats step (a). FS locks are stored in volatile pages.

FILE ACCESS AND RESOURCE SHARING - BYTE RANGE LOCKING

Byte Range Locking is a file system locking service exported to the users through the Win32 LockFile() and LockFileEx() API. It allows simultaneous access to different non-overlapping regions of a file data stream by multiple users. To access the data stream, the user locks the region (byte range) of the file to gain exclusive or shared read access to the region.

The file system 60 supports byte range locking for each individual data stream of the file. The following Win32-style byte range locking behavior is supported: (a) locking a region of a file is used to acquire shared or exclusive access to the specified region of the file, and the file system 60 will track byte range locks by file handle, therefore file handles provide a way to identify uniquely the owner of the lock; (b) locking a region that goes beyond the current end-of-file position is not an error; (c) locking a portion of a file for exclusive access denies all other processes both read and write access to the specified region of the file, and locking a portion of a file for shared access denies all other processes write access to the specified region of the file but allows other processes to read the locked region, and this means that the file system 60 must check byte range locks set on the data stream not only for lock requests but for every read or write access; (d) if an exclusive lock is requested for a region that is already locked either shared or exclusively by other threads, the request blocks or fails immediately depending on the calling option specified.; and (e) locks may not overlap an existing locked region of the file.

For each byte range lock, the file system 60 creates a byte range lock record to represent the lock. The record contains the following information: (a) byte range; (b) lock mode (shared or exclusive); (c) process identification; and (d) a Win32 lock key value.

The file system 60 regards the file byte ranges as resources with controlled access. For each byte range lock record, the file system 60 creates a file system lock (as discussed above) to coordinate the access to the byte range "resource." A compatible byte range lock request (share lock) translates into taking read lock on the file system lock associated with the byte range record. An exclusive byte range lock request is mapped to taking write lock on the file system lock.

Using the file system locking mechanism discussed above, lock requests waiting on the page containing the desired byte range will be notified when the page content changes.

Addressable Shared Memory Space

Having described the invention and various embodiments thereof in some detail, a more detailed description is now provided of the addressable shared memory space that is disclosed in the commonly-owned U.S. patent application Ser. No. 08/754,481 filed Nov. 22, 1996, and incorporated by reference above. All of the information provided below is contained in that patent application.

The addressable shared memory system disclosed in the U.S. patent application incorporated by reference is an "engine" that can create and manage a virtual memory space that can be shared by each computer on a network and can span the storage space of each memory device connected to the network. Accordingly, all data stored on the network can be stored within the virtual memory space and the actual physical location of the data can be in any of the memory devices connected to the network.

More specifically, the engine or system can create or receive, a global address signal that represents a portion, for example 4k bytes, of the virtual memory space. The global address signal can be decoupled from, i.e. unrelated to, the physical and identifier spaces of the underlying computer hardware, to provide support for a memory space large enough to span each volatile and persistent memory device connected to the system. For example, systems of the invention can operate on 32-bit computers, but can employ global address signals that can be 128 bits wide. Accordingly, the virtual memory space spans $2^{128}$ bytes, which is much larger than the $2^{32}$ address space supported by the underlying computer hardware. Such an address space can be large enough to provide a separate address for every byte of data storage on the network, including all RAM, disk and tape storage.

For such a large virtual memory space, typically only a small portion is storing data at any time. Accordingly, the system includes a directory manager that tracks those portions of the virtual memory space that are in use. The system provides physical memory storage for each portion of the virtual memory space in use by mapping each such portion to a physical memory device, such as a RAM memory or a hard-drive. Optionally, the mapping includes a level of indirection that facilitates data migration, fault-tolerant operation, and load balancing.

By allowing each computer to monitor and track which portions of the virtual memory space are in use, each computer can share the memory space. This allows the networked computers to appear to have a single memory, and therefore can allow application programs running on different computers to communicate using techniques currently employed to communicate between applications running on the same machine.

In one aspect, the invention of the above-identified, incorporated-by-reference U.S. patent application can be understood to include computer systems having a addressable shared memory space. The systems can comprise a data network that carries data signals representative of computer readable information a persistent memory device that couples to the data network and that provides persistent data storage, and plural computers that each have an interface that couples to the data network, for accessing the data network to exchange data signals therewith. Moreover, each of the computers can include a shared memory subsystem for mapping a portion of the addressable memory space to a portion of the persistent storage to provide addressable persistent storage for data signals.

In a system that distributes the storage across the memory devices of the network, the persistent memory device will be understood to include a plurality of local persistent memory devices that each couple to a respective one of the plural computers. To this same end, the system can also include a distributor for mapping portions of the addressable memory space across the plurality of local persistent memory devices and a disk directory manager for tracking the mapped portions of the addressable memory space to provide information representative of the local persistent memory device that stores that portion of the addressable memory space mapped thereon.

The systems can also include a cache system for operating one of the local persistent memory devices as a cache memory for cache storing data signals associated with recently accessed portions of the addressable memory space. Further the system can include a migration controller for selectively moving portions of the addressable memory space between the local persistent memory devices of the plural computers. The migration controller can determine and respond to data access patterns, resource demands or any other criteria or heuristic suitable for practice with the invention. Accordingly, the migration controller can balance the loads on the network, and move data to nodes from which it is commonly accessed. The cache controller can be a software program running on a host computer to provide a software managed RAM and disk cache. The RAM can be any volatile memory including SRAM, DRAM or any other volatile memory. The disk can be any persistent memory including any disk, RAID, tape or other device that provides persistent data storage.

The systems can also include a coherent replication controller for generating a copy, or select number of copies, of a portion of the addressable memory space maintained in the local persistent memory device of a first computer and for storing the copy in the local persistent memory device of a second computer. The coherent replication controller can maintain the coherency of the copies to provide coherent data replication.

The systems can also be understood to provide integrated control of data stored in volatile memory and in persistent memory. In such systems a volatile memory device has volatile storage for data signals, and the shared memory subsystem includes an element, typically a software module, for mapping a portion of the addressable memory space to a portion of the volatile storage. In these systems the volatile memory device can be comprised of a plurality of local volatile memory devices each coupled to a respective one of the plural computers, and the persistent memory device can be comprised of a plurality of local persistent memory devices each coupled to a respective one of the plural computers.

In these systems, a directory manager can track the mapped portions of the addressable memory space, and can include two sub-components; a disk directory manager for tracking portions of the addressable memory space mapped to the local persistent memory devices, and a RAM directory manager for tracking portions of the addressable memory space mapped to the local volatile memory devices. Optionally, a RAM cache system can operate one of the local volatile memory devices as a cache memory for cache storing data signals associated with recently accessed portions of the addressable memory space.

The systems can include additional elements including a paging element for remapping a portion of the addressable memory space between one of the local volatile memory devices and one of the local persistent memory devices; a policy controller for determining a resource available signal representative of storage available on each of the plural computers and, a paging element that remaps the portion of addressable memory space from a memory device of a first computer to a memory device of a second computer, responsive to the resource available signal; and a migration controller for moving portions of addressable memory space between the local volatile memory devices of the plural computers.

Optionally, the systems can include a hierarchy manager for organizing the plural computers into a set of hierarchical groups wherein each group includes at least one of the plural computers. Each the group can include a group memory manager for migrating portions of addressable memory space as a function of the hierarchical groups.

The system can maintain coherency between copied portions of the memory space by including a coherent replication controller for generating a coherent copy of a portion of addressable memory space.

The system can generate or receive global address signals. Accordingly the systems can include an address generator for generating a global address signal representative of a portion of addressable memory space. The address generator can include a spanning unit for generating global address signals as a function of a storage capacity associated with the persistent memory devices, to provide global address signals capable of logically addressing the storage capacity of the persistent memory devices.

In distributed systems, the directory manager can be a distributed directory manager for storing within the distributed memory space, a directory signal representative of a storage location of a portion of the addressable memory space. The distributed directory manager can include a directory page generator for allocating a portion of the addressable memory space and for storing therein an entry signal representative of a portion of the directory signal. The directory page generator optionally includes a range generator for generating a range signal representative of a portion of the addressable memory space, and for generating the entry signal responsive to the range signal, to provide an entry signal representative of a portion of the directory signal that corresponds to the portion of the addressable memory space. Moreover, the distributed directory manager can include a linking system for linking the directory pages to form a hierarchical data structure of the linked directory pages as well as a range linking system for linking the directory pages, as a function of the range signal, to form a hierarchical data structure of linked directory pages.

As the data stored by the system can be homeless, in that the data has no fixed physical home, but can migrate, as resources and other factors dictate, between the memory devices of the network, a computer system according to the invention can include a directory page generator that has a node selector for generating a responsible node signal representative of a select one of the plural computers having location information for a portion of the shared address space. This provides a level of indirection that decouples the directory from the physical storage location of the data. Accordingly, the directory needs only to identify the node, or other device, that tracks the physical location of the data. This way, each time data migrates between physical storage locations, the directory does not have to be updated, since the node tracking the location of the data has not changed and still provides the physical location information.

Accordingly, the system can include page generators that generate directory pages that carry information representative of a location monitor, such as a responsible computer node, that tracks a data storage location, to provide a directory structure for tracking homeless data. Moreover, the directory itself can be stored as pages within the virtual memory space. Therefore, the data storage location can store information representative of a directory page, to store the directory structure as pages of homeless data.

In another aspect, the invention of the above-identified, incorporated-by-reference U.S. patent application can be understood as methods for providing a computer system having a addressable shared memory space. The method can include the steps of providing a network for carrying data signals representative of computer readable information, providing a hard-disk, coupled to the network, and having persistent storage for data signals, providing plural computers, each having an interface, coupled to the data network, for exchanging data signals between the plural computers, and assigning a portion of the addressable memory space to a portion of the persistent storage of the hard disk to provide addressable persistent storage for data signals.

Figure 5:
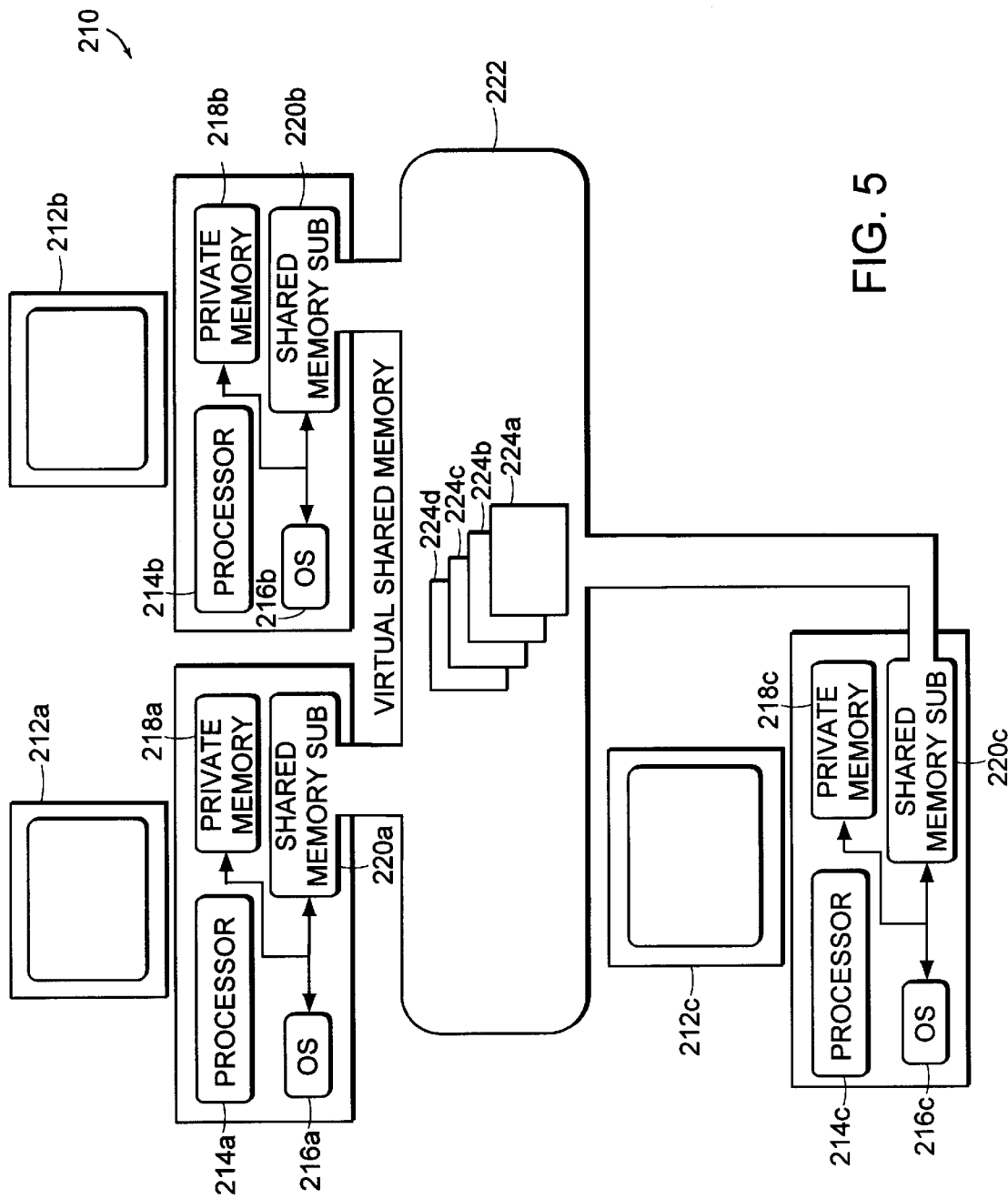
FIG. 5 illustrates a distributed shared memory computer network.

Turning now to the drawings related to the addressable shared memory system or engine of the above-identified, incorporated-by-reference U.S. patent application, FIG. 5 illustrates a computer network 10 that provides a shared memory that spans the memory space of each node of the depicted computer network 210.

Specifically, FIG. 5 illustrates a computer network 210 that includes a plurality of nodes 212a–212c, each having a CPU 214, an operating system 216, an optional private memory device 218, and a shared memory subsystem 220. As further depicted in by FIG. 5, each node 212a–212c connects via the shared memory subsystem 220 to a virtual shared memory 222. As will be explained in greater detail hereinafter, by providing the shared memory subsystem 220 that allows the node 212a–212c to access the virtual shared memory 222, the computer network 210 enables network nodes 212a–212c to communicate and share functionality using the same techniques employed by applications when communicating between applications running on the same machine. These techniques can employ object linking and embedding, dynamic link libraries, class registering, and other such techniques. Accordingly, the nodes 212 can employ the virtual shared memory 222 to exchange data and objects between application programs running on the different nodes 212 of the network 210.

In the embodiment depicted in FIG. 5, each node 212 can be a conventional computer system such as a commercially available IBM PC compatible computer system. The processor 214 can be any processor unit suitable for performing the data processing for that computer system. The operating system 216 can be any commercially available or proprietary operating system that includes, or can access, functions for accessing the local memory of the computer system and networking.

The private memory device 218 can be any computer memory device suitable for storing data signals representative of computer readable information. The private memory provides the node with local storage that can be kept inaccessible to the other nodes on the network. Typically the private memory device 218 includes a RAM, or a portion of a RAM memory, for temporarily storing data and application programs and for providing the processor 214 with memory storage for executing programs. The private memory device 18 can also include persistent memory storage, typically a hard disk unit or a portion of a hard disk unit, for the persistent storage of data.

The shared memory subsystem 220 depicted in FIG. 5 is an embodiment of the invention that couples between the operating system 216 and the virtual shared memory 222 and forms an interface between the operating system 216 and the virtual shared memory to allow the operating system 216 to access the virtual shared memory 222. The depicted shared memory subsystem 220 is a software module that operates as a stand-alone distributed shared memory engine. The depicted system is illustrative and other systems of the invention can be realized as shared memory subsystems that can be embedded into an application program, or be implemented as an embedded code of a hardware device. Other such applications can be practiced without departing from the scope of the invention.

The depicted virtual shared memory 222 illustrates a virtual shared memory that is accessible by each of the nodes 212a–212c via the shared memory subsystem 220. The virtual shared memory 222 can map to devices that provide physical storage for computer readable data, depicted in FIG. 5 as a plurality of pages 224a–224d. In one embodiment, the pages form portions of the shared memory space and divide the address space of the shared memory into page addressable memory spaces. For example the address space can be paged into 4K byte sections. In other embodiments alternative granularity can be employed to manager the shared memory space. Each node 212a–212c through the shared memory subsystem 220 can access each page 224a–224d stored in the virtual shared memory 222. Each page 224a–224d represents a unique entry of computer data stored within the virtual shared memory 222. Each page 224a–224d is accessible to each one of the nodes 212a–212c, and alternatively, each node can store additional pages of data within the virtual shared memory 222. Each newly stored page of data can be accessible to each of the other nodes 212a–212c. Accordingly, the virtual shared memory 222 provides a system for sharing and communicating data between each node 212 of the computer network 210.

Figure 6:
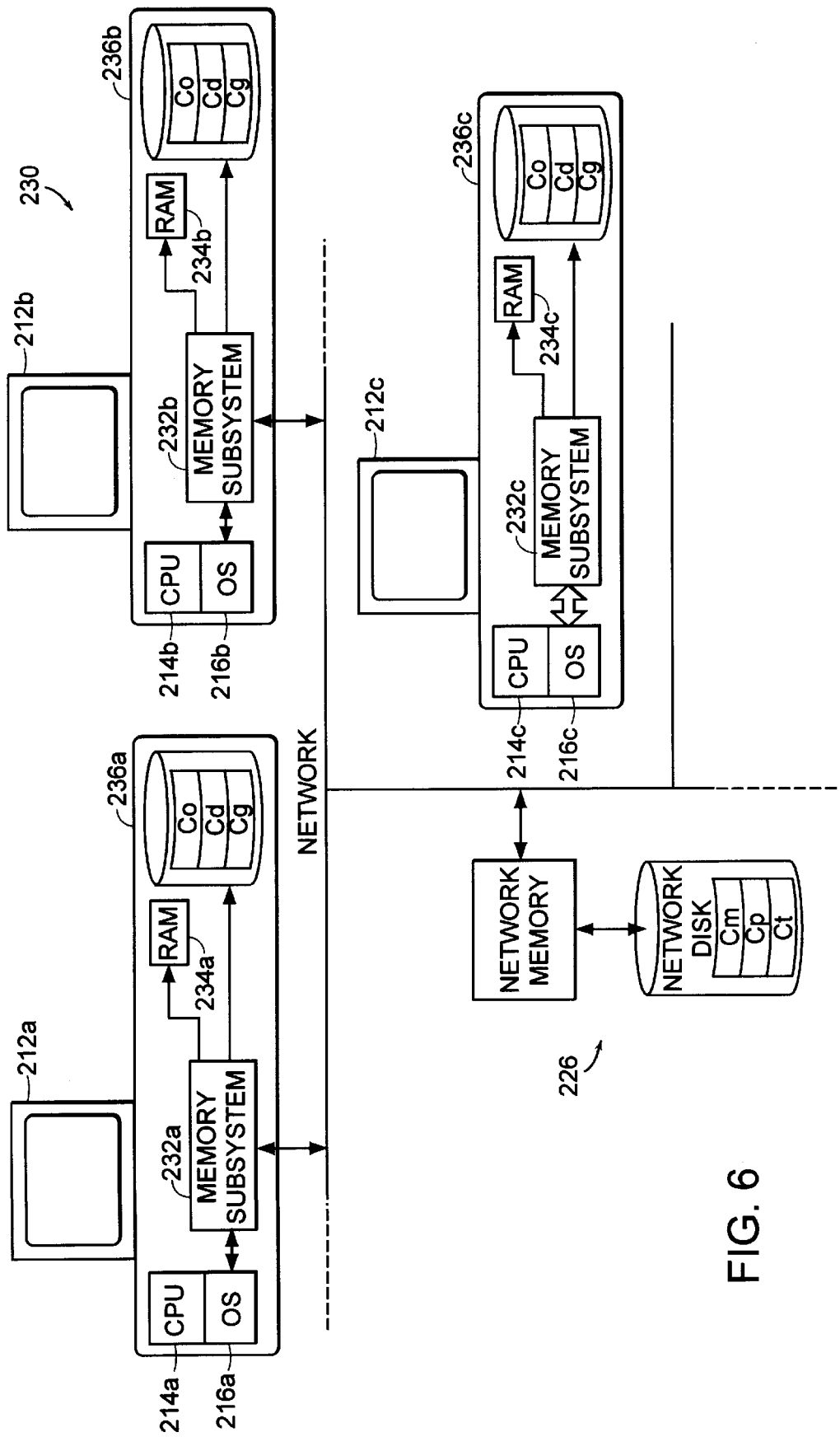
FIG. 6 is a functional block diagram that illustrates in more detail one distributed shared memory computer network of the type shown in FIG. 5.

FIG. 6 illustrates in functional block diagram form a computer network 230 that has a distributed shared memory. In this embodiment, each node 212a–212c has a memory subsystem 232 that connects between the operating system 216 and the two local memory devices, the RAM 234 and the disk 236, and that further couples to a network 238 that couples to each of the depicted nodes 212a, 212b and 212c and to a network memory device 226.

More particularly, FIG. 6 illustrates a distributed shared memory network 30 that includes a plurality of nodes 212a–212c, each including a processing unit 214, an operating system 216, a memory subsystem 232, a RAM 234, and a disk 236. FIG. 6 further depicts a computer network system 38 that connects between the nodes 212a–212c and the network memory device 226. The network 238 provides a network communication system across these elements.

The illustrated memory subsystems 232a–232c that connect between the operating system 216a–216c, the memory elements 234a–234c, 236a–236c, and the network 238, encapsulate the local memories of each of the nodes to provide an abstraction of a shared virtual memory system that spans across each of the nodes 212a–212c on the network 238. The memory subsystems 232a–232c can be software modules that act as distributors to map portions of the addressable memory space across the depicted memory devices. The memory subsystems further track the data stored in the local memory of each node 212 and further operate network connections with network 238 for transferring data between the nodes 212a–212c. In this way, the memory subsystems 232a–232c access and control each memory element on the network 238 to perform memory access operations that are transparent to the operating system 216. Accordingly, the operating system 216 interfaces with the memory subsystem 232 as an interface to a global memory space that spans each node 212a–212c on the network 238.

FIG. 6 further depicts that the system 230 provides a distributed shared memory that includes persistent storage for portions of the distributed memory. In particular, the depicted embodiment includes a memory subsystem, such as subsystem 232a, that interfaces to a persistent memory device, depicted as the disk 236a. The subsystem 232a can operate the persistent memory device to provide persistent storage for portions of the distributed shared memory space. As illustrated, each persistent memory device 236 depicted in FIG. 6 has a portion of the addressable memory space mapped onto it. For example, device 236a has the portions of the addressable memory space, $C_o$, $C_d$, $C_g$, mapped onto it, and provides persistent storage for data signals stored in those ranges of addresses.

Accordingly, the subsystem 232a can provide integrated control of persistent storage devices and electronic memory to allow the distributed shared memory space to span across both types of storage devices, and to allow portions of the distributed shared memory to move between persistent and electronic memory depending on predetermined conditions, such as recent usage.

In one optional embodiment, the nodes of the network are organized into a hierarchy of groups. In this embodiment, the memory subsystems 232a–232c can include a hierarchy manager that provides hierarchical control for the distribution of data. This includes controlling the migration controller, and policy controller, which are discussed in detail below, to perform hierarchical data migration and load balancing, such that data migrates primarily between computers of the same group, and passes to other groups in hierarchical order. Resource distribution is similarly managed.

Figure 7:
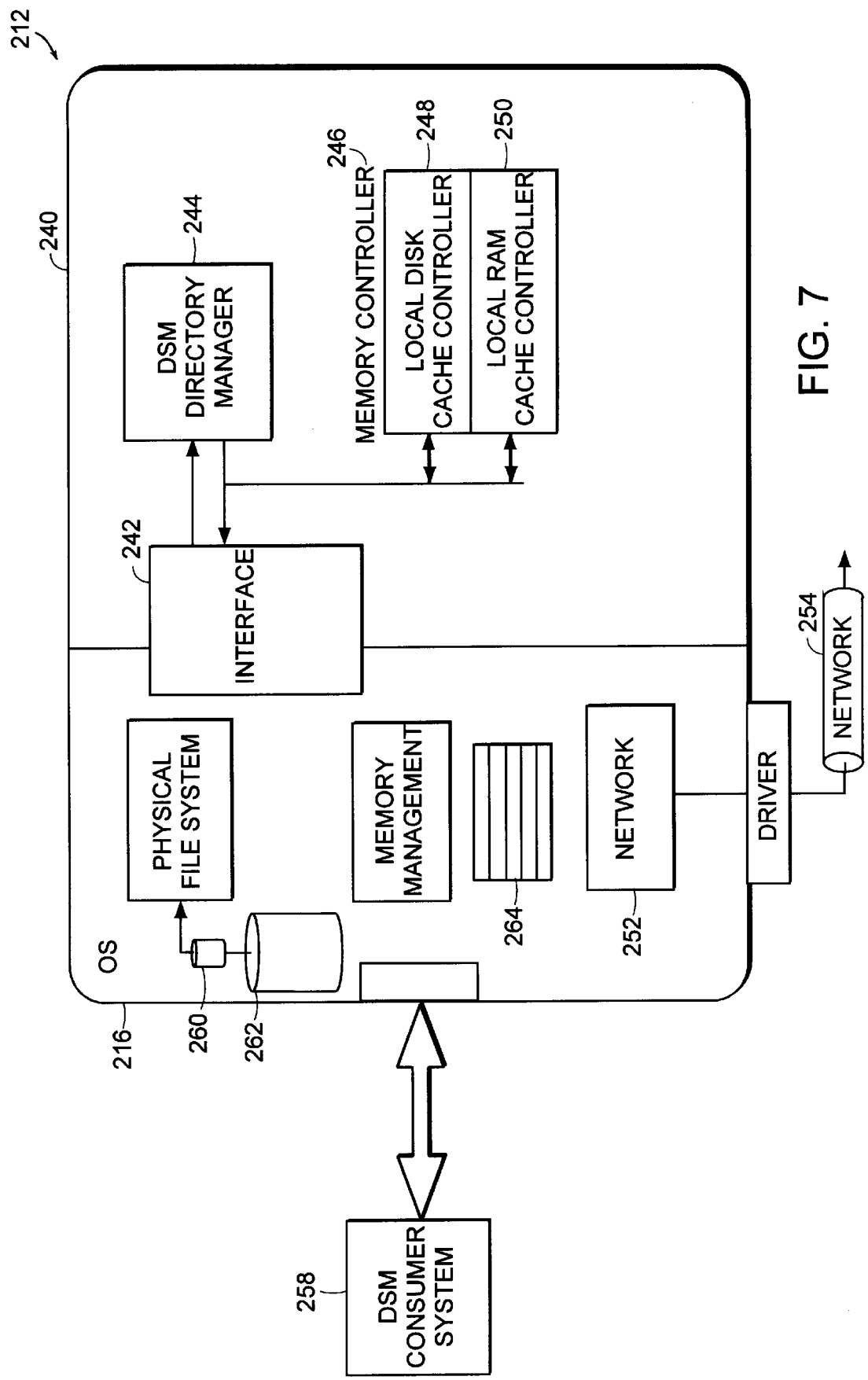
FIG. 7 illustrates in more detail a shared memory subsystem suitable for practice with the network illustrated in FIG. 6.

FIG. 7 illustrates in more detail one shared memory subsystem 240 according to the invention. FIG. 7 depicts a shared memory subsystem 240, that includes an interface 242, a DSM directory manager 244, a memory controller 246, a local disk cache controller 248, and a local RAM cache controller 250. FIG. 7 further depicts the network 254, an optional consumer of the DSM system, depicted as the service 258, the operating system 216, a disk driver 260, a disk element 262 and a RAM element 264.

The shared memory subsystem 240 depicted in FIG. 7 can encapsulate the memory management operations of the network node 212 to provide a virtual shared memory that can span across each node that connects into the network 254. Accordingly, each local node 212 views the network as a set of nodes that are each connected to a large shared computer memory.

The depicted interface 242 provides an entry point for the local node to access the shared memory space of the computer network. The interface 242 can couple directly to the operating system 216, to a distributed service utility such as the depicted DSM file system 258, to a distributed user-level service utility, or alternatively to any combination thereof.

The depicted interface 242 provides an API that is a memory oriented API. Thus, the illustrated interface 242 can export a set of interfaces that provide low-level control of the distributed memory. As illustrated in FIG. 7, the interface 242 exports the API to the operating system 216 or to the optional DSM service 258. The operating system 216 or the service employs the interface 242 to request standard memory management techniques, such as reading and writing from portions of the memory space. These portions of the memory space can be the pages as described above which can be 4K byte portions of the shared memory space, or other units of memory, such as objects or segments. Each page can be located within the shared memory space which is designated by a global address signal for that page of memory. The system can receive address signals from an application program or, optionally, can include a global address generator that generates the address signals. The address generator can include a spanning module that generates address signals for a memory space that spans the storage capacity of the network.

Accordingly, in one embodiment, the interface 242 receives requests to manipulate pages of the shared memory space. To this end, the interface 242 can comprise a software module that includes a library of functions that can be called by services, the OS 216, or other caller, or device. The function calls provide the OS 216 with an API of high level memory oriented services, such as read data, write data, and allocate memory. The implementation of the functions can include a set of calls to controls that operate the directory manager 244, and the local memory controller 246. Accordingly, the interface 242 can be a set of high level memory function calls to interface to the low-level functional elements of shared memory subsystem 240.

FIG. 7 further depicts a DSM directory manager 244 that couples to the interface 242. The interface 242 passes request signals that represent requests to implement memory operations such as allocating a portion of memory, locking a portion of memory, mapping a portion of memory, or some other such memory function. The directory manager 244 manages a directory that can include mappings than can span across each memory device connected to the network 238 depicted in FIG. 6, including each RAM and disk element accessible by the network. The directory manager 244 stores a global directory structure that provides a map of the global address space. In one embodiment as will be explained in greater detail hereinafter, the directory manager 244 provides a global directory that maps between global address signals and responsible nodes on the network. A responsible node stores information regarding the location and attributes of data associated with a respective global address, and optionally stores a copy of that page's data. Consequently, the directory manager 244 tracks information for accessing any address location within the identifier space.

The control of the distributed shared memory can be coordinated by the directory manager 244 and the memory controller 246. The directory manager 244 maintains a directory structure that can operate on a global address received from the interface 242 and identify, for that address, a node on the network that is responsible for maintaining the page associated with that address of the shared memory space. Once the directory manager 244 identifies which node is responsible for maintaining a particular address, the directory manager 244 can identify a node that stores information for locating a copy of the page, and make the call to the memory controller 246 of that node and pass to that node's memory controller the memory request provided by the memory interface 242. Accordingly, the depicted directory manager 244 is responsible for managing a directory structure that identifies for each page of the shared memory space a responsible node that tracks the physical location of the data stored in the respective page. Thus, the directory, rather than directly providing the location of the page, can optionally identify a responsible node, or other device, that tracks the location of the page. This indirection facilitates maintenance of the directory as pages migrate between nodes.

The memory controller 246 performs the low level memory access functions that physically store data within the memory elements connected to the network. In the depicted embodiment, the directory manager 244 of a first node can pass a memory access request through the interface 242, to the network module of the OS 216, and across the network 254 to a second node that the directory manager 244 identifies as the responsible node for the given address. The directory manager 244 can then query the responsible node to determine the attributes and the current owner node of the memory page that is associated with the respective global address. The owner of the respective page is the network node that has control over the memory storage element on which the data of the associated page is stored. The memory controller 246 of the owner can access, through the OS 216 of that node or through any interface, the memory of the owner node to access the data of the page that is physically stored on that owner node.

In particular, as depicted in FIG. 7, the directory manager 244 couples to the network module 252 which couples to the network 254. The directory manager can transmit to the network module 252 a command and associated data that directs the network interface 252 to pass a data signal to the owner node. The owner node receives the memory request across network 254 and through network module 252 that passes the memory request to the interface 242 of that owner node. The interface 242 couples to the memory controller 246 and can pass the memory request to the local memory controller of that owner node for operating the local storage elements, such as the disk or RAM elements, to perform the requested memory operation.

Once the owner node has performed the requested memory operation, such as reading a page of data, the memory subsystem 240 of the owner node can then transfer the page of data, or a copy of the page of data, via the network 254 to the node that originally requested access to that portion of the shared memory. The page of data is transferred via the network 254 to the network module 252 of the requesting node and the shared memory subsystem 240 operates the memory controller 246 to store in the local memory of the requesting node a copy of the accessed data.

Accordingly, in one embodiment of the invention, when a first node accesses a page of the shared memory space which is not stored locally on that node, the directory manager 244 identifies a node that has a copy of the data stored in that page and moves a copy of that data into the local memory of the requesting node. The local memory storage, both volatile and persistent, of the requesting node therefore becomes a cache for pages that have been requested by that local node. This embodiment is depicted FIG. 7 which depicts a memory controller that has a local disk cache controller 248 and a local RAM cache controller 250. Both of these local cache controllers can provide to the operating system 216, or other consumer pages of the shared memory space that are cache stored in the local memory of the node, including local persistent memory and local volatile memory.

The shared memory subsystem can include a coherent replication controller that maintains coherency between cached pages by employing a coherence through invalidation process, a coherence through migration process or other coherence process suitable for practice with the present invention. The coherent replication controller can automatically generate a copy of the data stored in each page and can store the copy in a memory device that is separate from the memory device of the original copy. This provides for fault tolerant operation, as the failure of any one memory device will not result in the loss of data. The coherent replication controller can be a software model that monitors all copies of pages kept in volatile memory and made available for writing. The controller can employ any of the coherency techniques named above, and can store tables of location information that identifies the location information for all generated copies.

Figure 8:
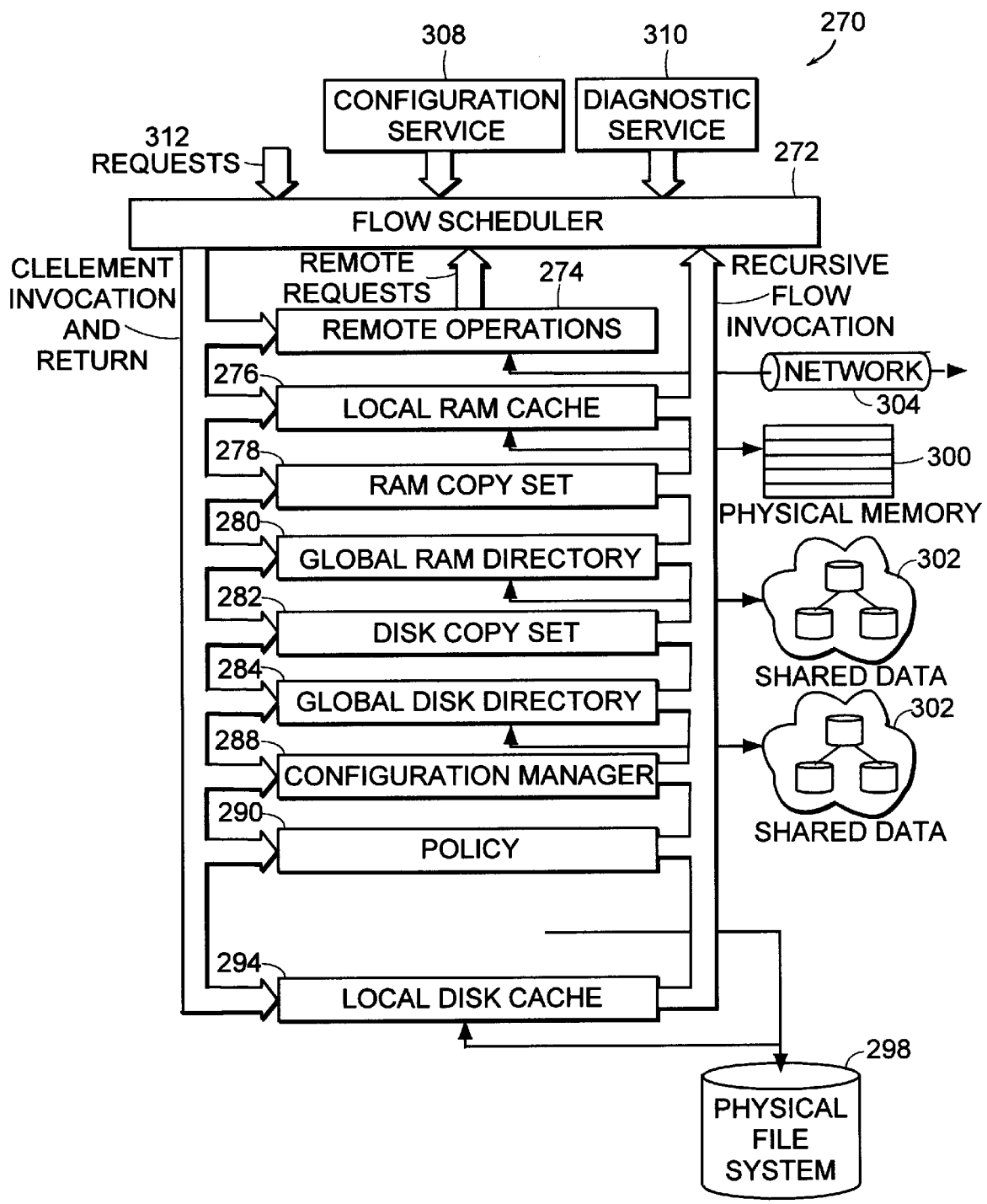
FIG. 8 is a functional block diagram of one shared memory subsystem according to the invention.

FIG. 8 illustrates in greater detail one embodiment of a shared memory subsystem according to the invention. The shared memory subsystem 270 depicted in FIG. 8 includes a remote operations element 274, a local RAM cache 276, a RAM copyset 278, a global RAM directory 280, a disk copyset 282, a global disk directory 284, a configuration manager 288, a policy element 290, and a local disk cache 94. FIG. 8 further depicts a network element 304, a physical memory 300, shared data element 302, a physical file system 298, which is part of the operating system 216, a configuration service 308, a diagnostic service 310, and a memory access request 312. The depicted subsystem 270 can be a computer program that couples to the physical memory, file system, and network system of the host node, or can be electrical circuit card assemblies that interface to the host node, or can be a combination of programs and circuit card assemblies.

The flow scheduler 272 depicted in FIG. 8 can orchestrate the controls provided by an API of the subsystem 270. In one embodiment, the flow scheduler 272 can be a state machine that monitors and responds to the requests 312 and remote requests through network 304 which can be instructions for memory operations and which can include signals representative of the global addresses being operated on. These memory operation requests 312 can act as op-codes for primitive operations on one or more global addresses. They can be read and write requests, or other memory operations. Alternatively, the flow scheduler 272 can be a program, such as an interpreter, that provides an execution environment and can map these op-codes into control flow programs called applets. The applets can be independent executable programs that employ both environment services, such as threading, synchronization, and buffer management, and the elements depicted in FIG. 8. The API is capable of being called from both external clients, like a distributed shared memory file system, as well as recursively by the applets and the other elements 274–294 of the subsystem 270. Each element can provide a level of encapsulation to the management of a particular resource or aspect of the system. To this end, each element can export an API consisting of functions to be employed by the applets. This structure is illustrated in FIG. 8. Accordingly, the flow scheduler 272 can provide an environment to load and execute applets. The applets are dispatched by the flow scheduler 272 on a per op-code basis and can perform the control flow for sequential or parallel execution of an element to implement the op-code on the specified global address, such as a read or write operation. Optionally, the flow scheduler 272 can include an element to change dynamically the applet at run time as well as execute applets in parallel and in interpreted mode.

The depicted shared memory subsystem 270 includes a bifurcated directory manager that includes the global RAM directory 280 and the global disk directory 284. The global RAM directory 280 is a directory manager that tracks information that can provide the location of pages that are stored in the volatile memory, typically RAM, of the network nodes. The global disk directory 284 is a global disk directory manager that manages a directory structure that tracks information that can provide the location of pages that are stored on persistent memory devices. Together, the global RAM directory 280 and the global disk directory 284 provide the shared memory subsystem 270 with integrated directory management for pages that are stored in persistent storage and volatile memory.

In one embodiment a paging element can operate the RAM and disk directory managers to remap portions of the addressable memory space between one of the volatile memories and one of the persistent memories. In the shared memory system, this allows the paging element to remap pages from the volatile memory of one node to a disk memory of another node. Accordingly, the RAM directory manager passes control of that page to the disk directory manager which can then treat the page as any other page of data. This allows for improved load balancing, by removing data from RAM memory, and storing it in the disk devices, under the control of the disk directory manager.

The local memory controller of the subsystem 270 is provided by the local RAM cache 276 and the local disk cache 294. The local RAM cache 276 which couples to the physical memory 300 of the local node can access, as described above, the virtual memory space of the local node to access data that is physically stored within the RAM memory 300. Similarly, the local disk cache 294 couples to the persistent storage device 298 and can access a physical location that maintains in the local persistent storage data of the distributed shared memory.

FIG. 8 also depicts a remote operations element 274 that couples between the network 304 and the flow scheduler 272. The remote operations element 274 negotiates the transfer of data across the network 304 for moving portions of the data stored in the shared memory space between the nodes of the network. The remote operations element 274 can also request services from remote peers, i.e. invalidate to help maintain coherency or for other reasons.

FIG. 8 also depicts a policy element 290 that can be a software module that acts as a controller to determine the availability of resources, such as printer capabilities, hard-disk space, available RAM and other such resources. The policy controller can employ any of the suitable heuristics to direct the elements, such as the paging controller, disk directory manager, and other elements to dynamically distribute the available resources.

FIG. 8 further depicts a memory subsystem 270 that includes a RAM copyset 278 and a disk copyset 282. These copysets can manage copies of pages that are cached at a single node. The disk copyset 282 can maintain information on copies of pages that are stored in the local disk cache, which can be the local persistent memory. Similarly, the RAM copyset 278 can maintain information on copies of pages that are stored in the local RAM cache which can be the local RAM. These copysets encapsulate indexing and storage of copyset data that can be employed by applets or other executing code for purposes of maintaining the coherency of data stored in the shared memory space. The copyset elements can maintain copyset data that identifies the pages cached by the host node. Further, the copyset can identify the other nodes on the network that maintain a copy of that page, and can further identify for each page which of these nodes is the owner node, wherein the owner node can be a node which has write privileges to the page being accessed. The copysets themselves can be stored in pages of the distributed shared memory space.

The local RAM cache 276 provides storage for memory pages and their attributes. In one embodiment, the local RAM cache 276 provides a global address index for accessing the cached pages of the distributed memory and the attributes based on that page. In this embodiment, the local ram cache 276 provides the index by storing in memory a list of each global address cached in the local RAM. With each listed global address, the index provides a pointer into a buffer memory and to the location of the page data. Optionally, with each listed global address, the index can further provide attribute information including a version tag representative of the version of the data, a dirty bit representative of whether the RAM cached data is a copy of the data held on disk, or whether the RAM cached data has been modified but not yet flushed to disk, a volatile bit to indicate if the page is backed by backing store in persistent memory, and other such attribute information useful for managing the coherency of the stored data.

In the embodiment depicted in FIG. 8, the memory subsystem 270 provides the node access to the distributed memory space by the coordinated operation of the directory manager that includes the global RAM directory 280 and the global disk directory 284, the cache controller that includes the local RAM cache and the local disk cache elements 276 and 294, and the copyset elements which include the RAM copyset 278 and the disk copyset 282.

The directory manager provides a directory structure that indexes the shared address space. Continuing with the example of a paged shared address space, the directory manager of the subsystem 270 allows the host node to access, by global addresses, pages of the shared memory space.

Figure 9:
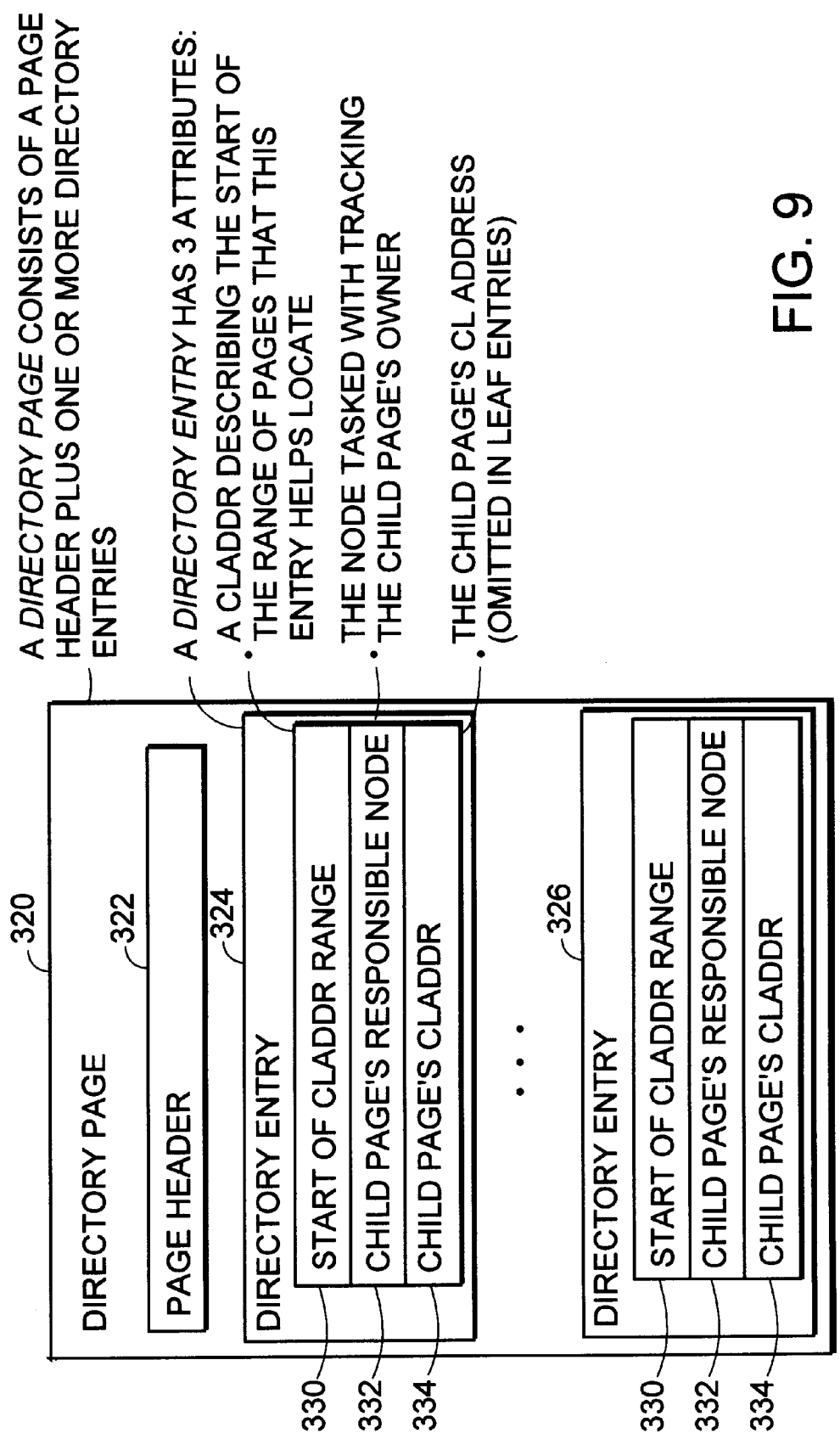
FIG. 9 illustrates a directory page that can be provided by a shared memory subsystem of the type depicted in FIG. 8.
Figure 10:
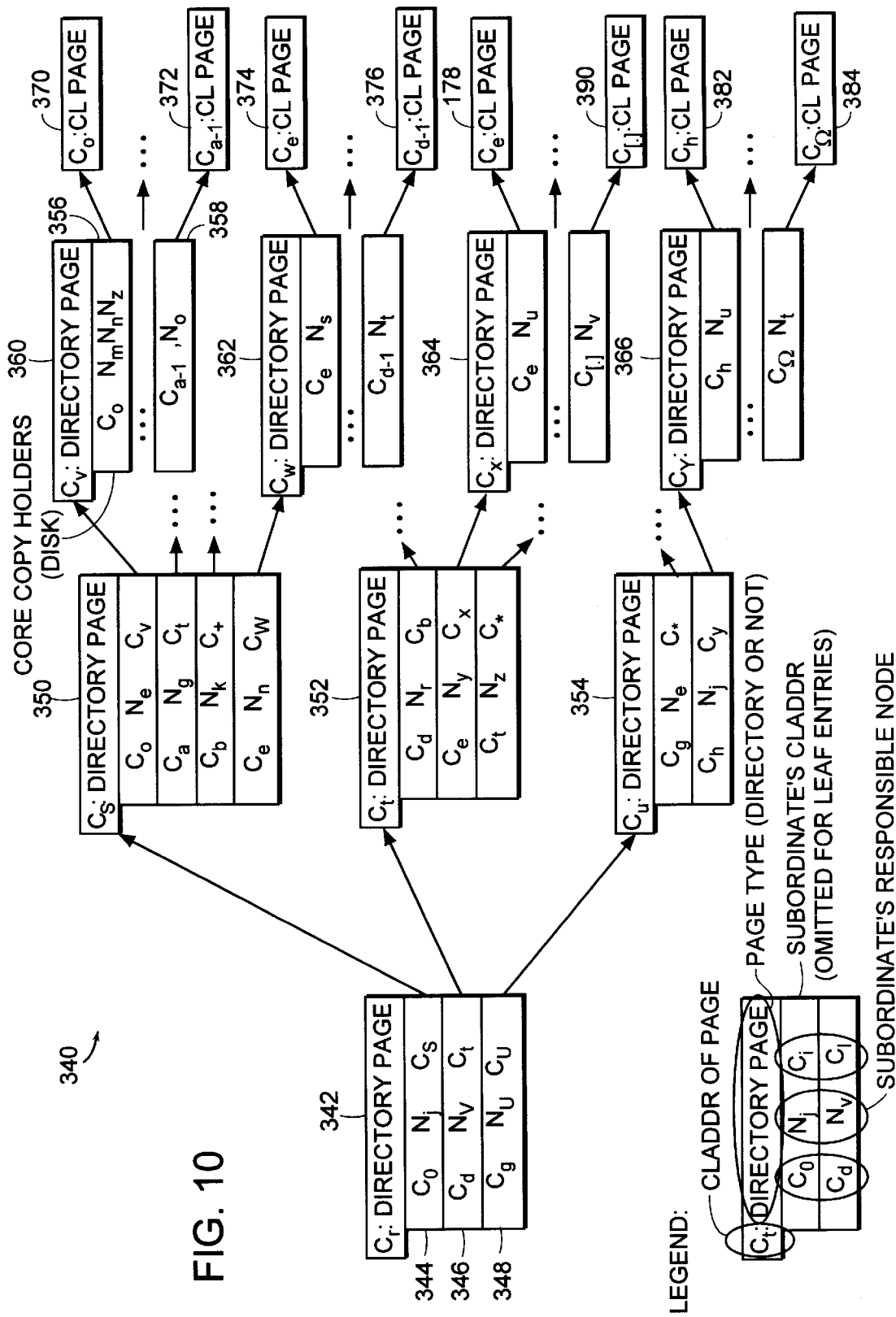
FIG. 10 illustrates a directory that can be distributed within a shared memory and formed of directory pages of the type illustrated in FIG. 9.

FIGS. 9 and 10 illustrate one example of a directory structure that provides access to the shared memory space. FIG. 9 depicts a directory page 320 that includes a page header 322, directory entries 324 and 326, wherein each directory entry includes a range field 330, a responsible node field 332, and an address field 334. The directory pages can be generated by a directory page generator that can be a software module controlled by the directory manager. It will be understood that the directory manager can generate multiple directories, including one for the Global disk and one for the Global RAM directories. The depicted directory page 320 can be a page of the global address space, such as a 4K byte portion of the shared address space. Therefore, the directory page can be stored in the distributed shared memory space just as the other pages to which the directory pages provide access.

As further depicted in FIG. 9, each directory page 120 includes a page header 322 that includes attribute information for that page header, which is typically metadata for the directory page, and further includes directory entries such as the depicted directory entries, 324 and 326, which provide an index into a portion of the shared address space wherein that portion can be one or more pages, including all the pages of the distributed shared memory space. The depicted directory page 320 includes directory entries that index a selected range of global addresses of the shared memory space. To this end, the directory generator can include a range generator so that each directory entry can include a range field 330 that describes the start of a range of addresses that that entry locates.

Accordingly, each directory page 320 can include a plurality of directory entries, such as entries 324 and 326, that can subdivide the address space into a subset of address ranges. For example, the depicted directory page 320 includes two directory entries 324 and 326. The directory entries 324 and 326 can, for example, subdivide the address space into two sub-portions. In this example, the start address range of the directory entry 324 could be the base address of the address space, and the start address range of the directory entry 326 could be the address for the upper half of the memory space. Accordingly, the directory entry 324 provides an index for pages stored in the address space between the base address and up to the mid-point of the memory space and, in complement thereto, the directory entry 326 provides an index to pages stored in the address space that ranges from the mid-point of the address space to the highest address.

FIG. 9 further depicts a directory page 320 that includes, in each directory entry, a responsible node field 332 and the child page global address field 334. These fields 332, 334 provide further location information for the data stored in pages within the address range identified in field 330.

FIG. 10 depicts a directory 340 formed from directory pages similar to those depicted in FIG. 9. FIG. 10 depicts that the directory 340 includes directory pages 342, 350–354, and 360–366. FIG. 10 further depicts that the directory 340 provides location information to the pages of the distributed shared memory space depicted in FIG. 10 as pages 370–384.

The directory page 342 depicted in FIG. 10 acts like a root directory page and can be located at a static address that is known to each node coupled to the distributed address space. The root directory page 342 includes three directory entries 344, 346, and 348. Each directory entry depicted in FIG. 10 has directory entries similar to those depicted in FIG. 9. For example, directory entry 344 includes a variable Co which represents the address range field 330, a variable Nj representative of the field 332, and a variable Cs representative of the field 334. The depicted root directory page 342 subdivides the address space into three ranges illustrated as an address range that extends between the address Co and Cd, a second address range that extends between the address Cd and Cg, and a third address range that extends between Cg and the highest memory location of the address space.

As further depicted in FIG. 10, each directory entry 344, 346, and 348 points to a subordinate directory page, depicted as directory pages 350, 352, and 354, each of which further subdivides the address range index by the associated directory entry of the root directory 342. In FIG. 9, this subdivision process continues as each of the directory pages 350, 352, and 354 each again have directory entries that locate subordinate directory pages including the depicted examples of directory pages 360, 362, 364, and 366.

The depicted example of directory pages 360, 362, 364, and 366 are each leaf entries. The leaf entries contain directory entries such as the directory entries 356 and 358 of the leaf entry 360, that store a range field 330 and the responsible node field 332. These leaf entries identify an address and a responsible node for the page in the distributed memory space that is being accessed, such as the depicted pages 370–384. For example, as depicted in FIG. 10, the leaf entry 356 points to the page 370 that corresponds to the range field 330 of the leaf entry 356, which for a leaf entry is the page being accessed. In this way, the directory structure 340 provides location information for pages stored in the distributed address space.

In the depicted embodiment of FIG. 10, a node selector can select a responsible node for each page, as described above, so that the leaf entry 356 provides information of the address and responsible node of the page being located. Accordingly, this directory tracks ownership and responsibility for data, to provide a level of indirection between the directory and the physical location of the data. During a memory access operation, the memory subsystem 270 passes to the responsible node indicated in the leaf entry 356 the address of the page being accessed. The shared memory subsystem of that node can identify a node that stores a copy of the page being accessed, including the owner node. This identification of a node having a copy can be performed by the RAM copyset or disk copyset of the responsible node. The node having a copy stored in its local physical memory, such as the owner node, can employ its local cache elements, including the local RAM cache and local disk cache to the identify from the global address signal a physical location of the data stored in the page being accessed. The cache element can employ the operating system of the owner node to access the memory device that maintains that physical location in order that the data stored in the page can be accessed. For a read-memory operation, or for other similar operations, the data read from the physical memory of the owner node can be passed via the network to the memory subsystem of the node requesting the read and subsequently stored into the virtual memory space of the requesting node for use by that node.

With reference again to FIG. 10, it can be seen that the depicted directory structure 340 comprises a hierarchical structure. To this end, the directory structure 340 provides a structure that continually subdivides the memory space into smaller and smaller sections. Further, each section is represented by directory pages of the same structure, but indexes address spaces of different sizes. As pages are created or deleted, a linker inserts or deletes the pages from the directory. In one embodiment, the linker is a software module for linking data structures. The linker can operate responsive to the address ranges to provide the depicted hierarchical structure. Accordingly, the depicted directory 340 provides a scaleable directory for the shared address space. Moreover, the directory pages are stored in the distributed address space and maintained by the distributed shared memory system. A root for the directory can be stored in known locations to allow for bootstrap of the system. Consequently, commonly used pages are copied and distributed, and rarely used pages are shuffled off to disk. Similarly, directory pages will migrate to those nodes that access them most, providing a degree of self-organization that reduces network traffic.

Figure 11:
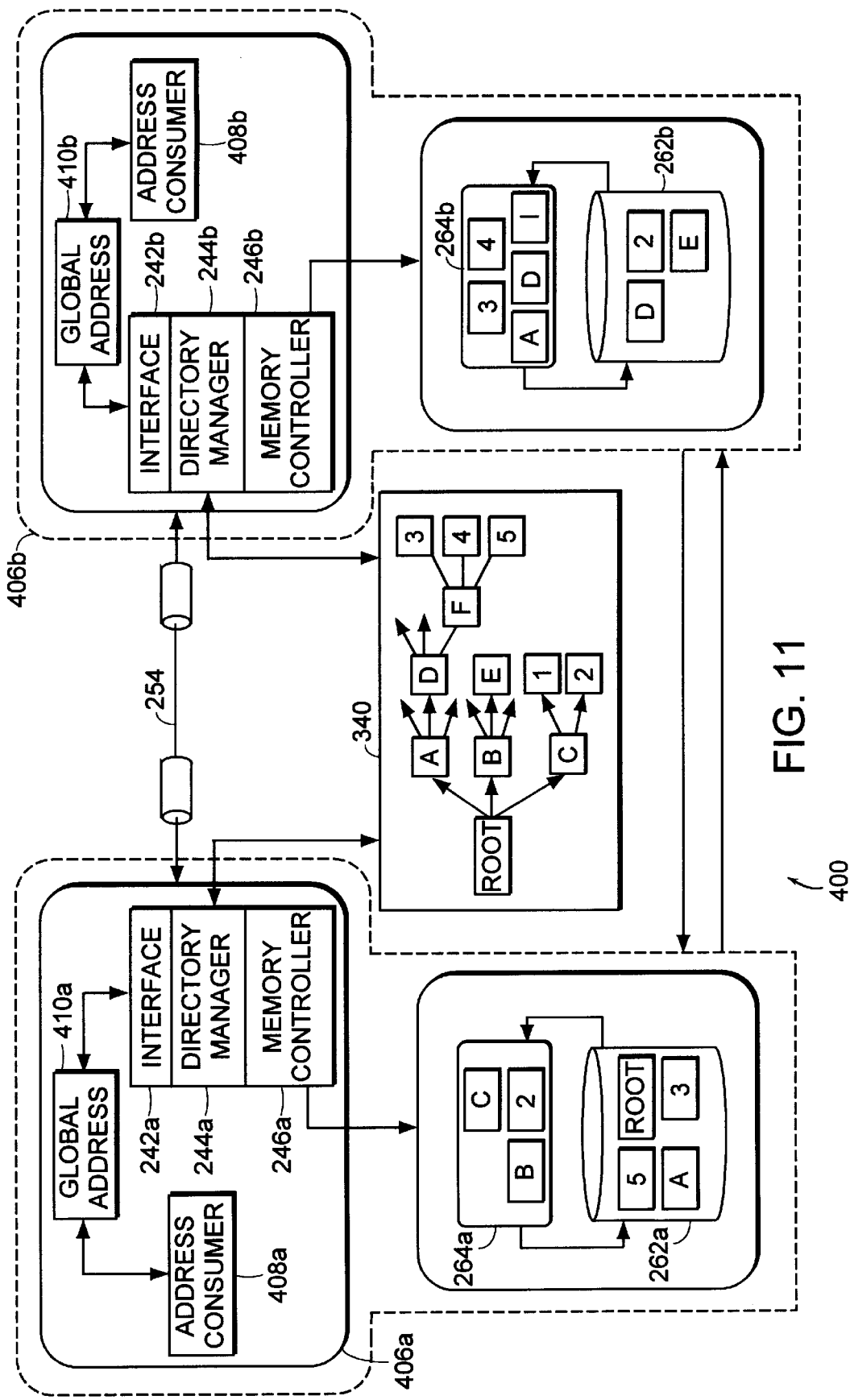
FIG. 11 illustrates in functional block diagram form a system that employs a directory according to FIG. 10 for tracking portions of a distributed shared memory.

FIG. 11 depicts the directory of FIG. 10 being employed by a system according to the invention. In particular FIG. 11 depicts a system 400 that includes two nodes, 406a and 406b, a directory structure 340, and a pair of local memories having volatile memory devices 264a and 264b, and persistent memory devices 262a and 262b. Depicted node 406a includes an address consumer 408a, a global address 410a, and interface 242a, a directory manager 244a and a memory controller 246a. Node 406b has corresponding elements. The nodes are connected by the network 254. The directory 340 has a root page, directory pages A–F, and pages 1–5.

Each node 406a and 406b operates as discussed above. The depicted address consumers 408a and 408b can be an application program, file system, hardware device or any other such element that requests access to the virtual memory. In operation, the address consumers 408a and 408b request an address, or range of addresses, and the directory manager can include a global address generator that provides the consumer with the requested address, or a pointer to the requested address. As addresses get generated, the respective directory managers 244a and 244b generate directory pages and store the pages in the directory structure 340. As depicted, the directory structure 340 tracks the portions of the address space being employed by the system 400, and physical storage for each page is provided within the local memories.

As shown in FIG. 11, the data associated with the directory pages are distributively stored across the two local memories and duplicate copies can exist. As described above and now illustrated in FIG. 11, the data can move between different local memories and also move, or page, between volatile and persistent storage. The data movement can be responsive to data requests made by memory users like application programs, or by operation of the migration controller described above. As also described above, the movement of data between different memory locations can occur without requiring changes to the directory 340. This is achieved by providing a directory 340 that is decoupled from the physical location of the data by employing a pointer to a responsible node that tracks the data storage location. Accordingly, although the data storage location can change, the responsible node can remain constant, thereby avoiding any need to change the directory 340.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for providing distributed control over a structured store of data, comprising:

providing a plurality of nodes inter-connected by a network, each of the plurality of nodes sharing a shared addressable memory space of a shared memory system and including (i) an interface for accessing the network, (ii) a local volatile memory device coupled to the node and providing volatile storage, (iii) a local persistent memory device coupled to the node and providing persistent storage, and (iv) a shared memory subsystem for mapping a portion of the shared addressable memory space to at least a portion of the persistent and volatile storage to provide thereby addressable persistent and volatile storage accessible by each of the plurality of nodes, the shared memory subsystem including (a) a distributor for mapping portions of the addressable memory space across the plurality of local persistent and volatile memory devices to distribute the addressable memory space across the plurality of local persistent and volatile memory devices, and (b) a disk directory manager for tracking the mapped portions of the addressable memory space to provide information representative of which of the local persistent and volatile memory devices has which of the portions of the addressable memory space mapped thereon;

storing on each node an instance of a data control program for manipulating the structured store of data to provide multiple, distributed instances of the data control program;

interfacing each instance of the data control program to the shared memory system; and operating each instance of the data control program to employ the shared memory system as a memory device having the structured store of data contained therein, whereby the shared memory system coordinates access to the structured store of data to provide distributed control over the structured store of data.

2. The method of claim 1 wherein said interfacing step further includes:

directing the data control program to provide a stream of data to be stored in the structured store of data; and directing the data control program to operate the shared memory system as a single-node memory device.

3. The method of claim 1 wherein the structured store of data comprises a file system, and wherein the data control program comprises a file control program for manipulating the file system, whereby the shared memory system controls access to the file system to provide a shared file system.

4. The method of claim 3 further comprising:
providing the shared file system with a file directory; and
operating the shared memory system to maintain the file directory within a shared memory space.

5. The method of claim 4 further comprising:
organizing the file directory as a plurality of logical file partitions stored within the shared memory space.

6. The method of claim 4 further comprising the step of coordinating shared access to data within the structured store by locking directories stored within a shared memory space.

7. The method of claim 3 further comprising:
generating, for a file stored within the shared file system, a file descriptor having storage for an identifier being representative of a portion of a shared memory space.

8. The method of claim 7 further comprising:
allocating contiguous portions of the shared memory space, each represented by a respective identifier, to provide reduced bookkeeping information for the file.

9. The method of claim 7 further comprising:
reserving contiguous segments of a storage device for storing data associated with the contiguous portions of the shared memory space for optimizing access to physical storage for the file.

10. The method of claim 1 wherein the structured store of data comprises a database system, and wherein the data control program comprises a database control program for manipulating the database system, whereby the shared memory system controls access to the database system to provide a shared database system.

11. The method of claim 10 further comprising:
providing the shared database system with a database directory and set of index structures; and
operating the shared memory system to maintain the database directory and set of index structures within a shared memory space.

12. The method of claim 11 further comprising:
organizing the database directory as a plurality of sets stored within the shared memory space.

13. The method of claim 10 further comprising the steps of:
associating concurrency control structures with portions of the database system;
storing the concurrency control structures in the shared memory space; and
coordinating shared access to the database system by locking concurrency control structures.

14. The method of claim 13 further comprising locking of database indices.

15. The method of claim 13 further comprising locking of database keys.

16. The method of claim 10 further comprising:
generating, for a database object stored within the shared database system, a database record descriptor having storage for an identifier being representative of a portion of a shared memory space.

17. The method of claim 16 further comprising:
allocating contiguous portions of the shared memory space, each represented by a respective identifier, to provide reduced bookkeeping information for the respective database record.

18. The method of claim 16 further comprising:
reserving contiguous segments of a storage device for storing data associated with the contiguous portions of the shared memory space for optimizing access to physical storage for the database record.

19. The method of claim 1 wherein the structured store of data comprises a Web server system, and wherein the data control program comprises a control program for manipulating the Web server system, and controlling access to the Web server system to provide a shared Web server system.

20. The method of claim 19 further comprising:
providing the shared Web server system with a directory mapping the files to their contents; and
operating the shared memory system to maintain the Web server directory within a shared memory space.

21. The method of claim 19 further comprising:
generating, for a file stored within the shared Web server system, a file descriptor having storage for an identifier being representative of a portion of a shared memory space.

22. The method of claim 21 further comprising:
allocating contiguous portions of the shared memory space, each represented by a respective identifier, to provide reduced bookkeeping information for the files.

23. The method of claim 21 further comprising:
reserving contiguous segments of a storage device for storing data associated with the contiguous portions of the shared memory space for optimizing access to physical storage for the files.

24. The method of claim 1 further comprising:
operating the shared memory system to replicate stored data coherently in order to provide a redundant store of data.

25. The method of claim 24 further comprising:
storing the coherently replicated data within different storage devices of the network to provide fault tolerant operation.

26. The method of claim 1 further comprising:
associating concurrency control structures with portions of the shared memory space;
storing the concurrency control structures in the shared memory space; and
coordinating shared access to data within the structured store by locking concurrency control structures.

27. The method of claim 26 further comprising:
generating a lock object data structure having information representative of a lock status on portions of the shared memory space; and
storing the lock object within the shared memory space to provide thereby a shared system lock.

28. The method of claim 26 wherein the locking step includes:
directing the shared memory to generate byte range locks representative of locks placed on portions of the shared memory space.

29. The method of claim 1 further comprising operating each instance of the data control program to employ the shared memory system as clustered structured storage, the memory system coordinating access to the clustered structured storage to provide distributed control over the clustered structured storage.

30. A method for providing distributed control over a structured store of data, comprising:
providing a plurality of nodes inter-connected by a network;
storing on each node an instance of a data control program for manipulating the structured store of data to provide multiple, distributed instances of the data control program, the structured store of data comprising a Web server system and the data control program comprising a control program for manipulating the Web server system and controlling access to the Web server system to provide a shared Web server system;

interfacing each instance of the data control program to a shared memory system that provides addressable persistent storage of data;

operating each instance of the data control program to employ the shared memory system as a memory device having the structured store of data contained therein, whereby the shared memory system coordinates access to the structured store of data to provide distributed control over the structured store of data;

providing the shared Web server system with a directory mapping files to their contents; and operating the shared memory system to maintain the Web server directory within a shared memory space.

31. A method for providing distributed control over a structured store of data, comprising:

providing a plurality of nodes inter-connected by a network;

storing on each node an instance of a data control program for manipulating the structured store of data to provide multiple, distributed instances of the data control program, the structured store of data comprising a Web server system and the data control program comprising a control program for manipulating the Web server system and controlling access to the Web server system to provide a shared Web server system;

interfacing each instance of the data control program to a shared memory system that provides addressable persistent storage of data;

operating each instance of the data control program to employ the shared memory system as a memory device having the structured store of data contained therein, whereby the shared memory system coordinates access to the structured store of data to provide distributed control over the structured store of data; and generating, for a file stored within the shared Web server system, a file descriptor having storage for an identifier being representative of a portion of a shared memory space.

32. The method of claim 31 further comprising:

allocating contiguous portions of the shared memory space, each represented by a respective identifier, to provide reduced bookkeeping information for the files.

33. The method of claim 31 further comprising:

reserving contiguous segments of a storage device for storing data associated with the contiguous portions of the shared memory space for optimizing access to physical storage for the files.

34. A method for providing distributed control over a structured store of data, comprising:

providing a plurality of nodes inter-connected by a network;

storing on each node an instance of a data control program for manipulating the structured store of data to provide multiple, distributed instances of the data control program, the structured store of data comprising a Web server system and the data control program comprising a control program for manipulating the Web server system and controlling access to the Web server system to provide a shared Web server system;

interfacing each instance of the data control program to a globally addressable unstructured storage system;

operating each instance of the data control program to employ the globally addressable unstructured storage system as a memory device containing structured storage to provide distributed control over the structured store of data;

providing the shared Web server system with a directory mapping files to their contents; and operating the globally addressable unstructured storage system to maintain the Web server directory.

35. A method for providing distributed control over a structured store of data, comprising:

providing a plurality of nodes inter-connected by a network;

storing on each node an instance of a data control program for manipulating the structured store of data to provide multiple, distributed instances of the data control program, the structured store of data comprising a Web server system and the data control program comprising a control program for manipulating the Web server system and controlling access to the Web server system to provide a shared Web server system;

interfacing each instance of the data control program to a globally addressable unstructured storage system;

operating each instance of the data control program to employ the globally addressable unstructured storage system as a memory device containing structured storage to provide distributed control over the structured store of data; and generating, for a file stored within the shared Web server system, a file descriptor having storage for an identifier being representative of a portion of the globally addressable unstructured storage system.

36. The method of claim 35 further comprising:

allocating contiguous portions of the globally addressable unstructured storage system, each represented by a respective identifier, to provide reduced bookkeeping information for the files.

37. The method of claim 35 further comprising:

reserving contiguous segments of a storage device for storing data associated with the contiguous portions of the globally addressable unstructured storage system for optimizing access to physical storage for the files.

* * * * *